(12) United States Patent
Feng et al.

(10) Patent No.: US 12,374,106 B2
(45) Date of Patent: Jul. 29, 2025

(54) VISUAL LOCALIZATION METHOD AND APPARATUS

(71) Applicant: HUAWEI TECHNOLOGIES CO., LTD., Guangdong (CN)

(72) Inventors: Wensen Feng, Shenzhen (CN); Huan Zhang, Shenzhen (CN); Jun Cao, Shenzhen (CN); Zhongwei Tang, Shanghai (CN); Jiangwei Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 538 days.

(21) Appl. No.: 17/743,892

(22) Filed: May 13, 2022

(65) Prior Publication Data

US 2022/0375220 A1   Nov. 24, 2022

Related U.S. Application Data

(63) Continuation of application No. PCT/CN2020/127005, filed on Nov. 6, 2020.

(30) Foreign Application Priority Data

Nov. 15, 2019   (CN) .......................... 201911122668.2
Feb. 27, 2020   (CN) .......................... 202010126108.0

(51) Int. Cl.
*G06V 20/00* (2022.01)
*G06T 7/73* (2017.01)
(Continued)

(52) U.S. Cl.
CPC ................ *G06V 20/39* (2022.01); *G06T 7/75* (2017.01); *G06V 10/761* (2022.01); *G06V 20/176* (2022.01)

(58) Field of Classification Search
CPC . G06T 2207/10032; G06T 2207/30244; G06T 17/00; G06V 20/13; G06V 20/17; G06V 20/39
See application file for complete search history.

(56) References Cited

U.S. PATENT DOCUMENTS

2002/0124171 A1\* 9/2002 Rhoads ................. G06T 1/0021
713/176
2009/0322742 A1\* 12/2009 Muktinutalapati ....... G06T 7/75
382/113
(Continued)

FOREIGN PATENT DOCUMENTS

CN       102084398 A       6/2011
CN       103424113 A       12/2013
(Continued)

OTHER PUBLICATIONS

Leung et al., Localization in Urban Environments by Matching Ground Level Video Images with an Aerial Image, 2008 IEEE International Conference on Robotics and Automation, , May 19-23, 2008, pp. 551-556, doi: 10.1109/ROBOT.2008.4543264.\*
(Continued)

*Primary Examiner* — Guillermo M Rivera-Martinez
(74) *Attorney, Agent, or Firm* — WOMBLE BOND DICKINSON (US) LLP

(57) ABSTRACT

A visual localization method and apparatus are provided. The method includes obtaining a captured first image, determining a first pose based on the first image and an aerial model, determining whether a ground model corresponding to the first pose exists in an aerial-ground model, and when the ground model corresponding to the first pose exists, determining a second pose based on the ground model. The aerial-ground model includes the aerial model and the ground model mapped to the aerial model, a coordinate system of the ground model is the same as a coordinate
(Continued)

system of the aerial model, and localization accuracy of the second pose is higher than localization accuracy of the first pose. Performing fine visual localization based on the ground model can improve accuracy and a success rate of localization.

20 Claims, 12 Drawing Sheets

(51) Int. Cl.
*G06V 10/74* (2022.01)
*G06V 20/10* (2022.01)

(56) References Cited

U.S. PATENT DOCUMENTS

| | | | | |
|---|---|---|---|---|
| 2010/0329542 | A1* | 12/2010 | Ramalingam | G06T 7/80 348/118 |
| 2011/0148866 | A1* | 6/2011 | Chu | G06T 17/05 345/419 |
| 2011/0282578 | A1* | 11/2011 | Miksa | G06F 16/29 701/532 |
| 2013/0063435 | A1* | 3/2013 | Stannard | G06T 17/05 345/420 |
| 2014/0153835 | A1* | 6/2014 | Pritt | G06F 16/29 382/203 |
| 2014/0191894 | A1* | 7/2014 | Chen | G06T 7/55 342/52 |
| 2014/0219514 | A1* | 8/2014 | Johnston | G06V 20/13 382/113 |
| 2014/0267254 | A1* | 9/2014 | Sievert | G06T 17/00 345/420 |
| 2015/0134690 | A1* | 5/2015 | McClendon | G06F 16/29 707/769 |
| 2015/0213590 | A1* | 7/2015 | Brown | G06T 17/05 345/419 |
| 2016/0321837 | A1* | 11/2016 | Dillard | G06T 15/503 |
| 2017/0116735 | A1* | 4/2017 | Aughey | G06V 20/17 |
| 2017/0200309 | A1* | 7/2017 | Qian | G06T 15/04 |
| 2017/0206648 | A1* | 7/2017 | Marra | G05D 1/0094 |
| 2018/0372493 | A1 | 12/2018 | Pilkington et al. | |
| 2019/0051056 | A1* | 2/2019 | Chiu | G06F 16/903 |
| 2019/0094027 | A1 | 3/2019 | Xu et al. | |
| 2019/0130641 | A1* | 5/2019 | Barajas Hernandez | G06V 20/13 |

FOREIGN PATENT DOCUMENTS

| | | | | |
|---|---|---|---|---|
| CN | 103900539 | A | | 7/2014 |
| CN | 104422439 | A | | 3/2015 |
| CN | 105953798 | A | | 9/2016 |
| CN | 107133325 | A | | 9/2017 |
| CN | 109099888 | A | | 12/2018 |
| CN | 109141442 | A | | 1/2019 |
| CN | 109357673 | A | | 2/2019 |
| CN | 109556596 | A | * | 4/2019 ........... G01C 21/005 |
| CN | 109669533 | A | | 4/2019 |
| CN | 110108258 | A | | 8/2019 |
| CN | 110223380 | A | * | 9/2019 ............ G06T 17/00 |
| CN | 110375739 | A | | 10/2019 |
| JP | 2012127896 | A | | 7/2012 |

OTHER PUBLICATIONS

Qiu et al, Model-Based Global Localization for Aerial Robots Using Edge Alignment, IEEE Robotics and Automation Letters, vol. 2, No. 3, Jul. 2017, pp. 1256-1263, doi: 10.1109/LRA.2017.2660063.*
Xiang et al., Mini-Unmanned Aerial Vehicle-Based Remote Sensing: Techniques, applications, and prospects, in IEEE Geoscience and Remote Sensing Magazine, vol. 7, No. 3, pp. 29-63, Sep. 2019, doi: 10.1109/MGRS.2019.2918840.*
Gao et al., Ground and aerial meta-data integration for localization and reconstruction: A review, vol. 127, Nov. 1, 2019, pp. 202-214, doi.org/10.1016/j.patrec.2018.07.036.*
Brejcha et al., State-of-the-art in visual geo-localization, Pattern Anal Applic 20, Mar. 28, 2017, pp. 613-637, doi.org/10.1007/s10044-017-0611-1.*
Li Haifeng, Research on Visual Localization for Mobile Robot in Urban Environment, Nankai University, 2012, 58 pages (with an English translation).
Geometric Urban Geo-Localization et al, Geolocalization using Skylines from Omni-Images, 2009 IEEE 12th International Conference on Computer Vision Workshops, ICCV Workshops, 8 pages.
Srikumar Ramalingam et al, SKYLINE2GPS: Localization in Urban Canyons using Omni-Skylines, The 2010 IEEE/RSJ International Conference on Intelligent Robots and Systems, Oct. 18-22, 2010, Taipei, Taiwan, 8 pages.
Mayank Bansal et al, Geometric Urban Geo-Localization, CVPR 2014, 8 pages.
Anil Armagan et al, Accurate Camera Registration in Urban Environments Using High-Level Feature Matching, Proceedings of the British Machine Vision Conference (BMVC), 2017, 12 pages.
Martin Hirzer et al, Efficient 3D Tracking in Urban Environments with Semantic Segmentation, Proceedings of the British Machine Vision Conference (BMVC), Sep. 2017, 12 pages.
Anil Armagan et al, Learning to Align Semantic Segmentation and 2.5D Maps for Geolocalization, 2017 IEEE Conference on Computer Vision and Pattern Recognition, 8 pages.
Anil Armagan et al, Semantic Segmentation for 3D Localization inUrban Environments, 2017 IEEE, 4 pages.
Bansal Mayank Mayank Bansal@SRI Com et al: "Geo-localization of street views with aerial image databases", ACM 2012 Conference on Computer Supported Cooperative Work Companion. CSCW12. ACM, USA, Nov. 28, 2011(Nov. 28, 2011), pp. 1125-1128, XP058600553.
Joel Janai et al: "Computer Vision for Autonomous Vehicles: Problems, Oatasets and State-of-the-Art", Computer Vision and Pattern Recognition, Apr. 18, 2017 (Apr. 18, 2017), pp. 1-67, XP055545645.
Majdik Anoras L et al: "Micro air vehicle localization and position tracking from textured 3D cadastral models", 2014 IEEE International Conference on Robotics and Automation (ICRA), IEEE, May 31, 2014 (May 31, 2014), pp. 920-927, XP032650685.

* cited by examiner

VISUAL LOCALIZATION METHOD AND APPARATUS

CROSS-REFERENCE TO RELATED APPLICATIONS

This application is a continuation of International Application No. PCT/CN2020/127005, filed on Nov. 6, 2020, which claims priority to Chinese Patent Application No. 202010126108.0, filed on Feb. 27, 2020 and Chinese Patent Application No. 201911122668.2, filed on Nov. 15, 2019. All of the aforementioned patent applications are hereby incorporated by reference in their entireties.

TECHNICAL FIELD

This application relates to an intelligent sensing technology, and in particular, to a visual localization method and apparatus.

BACKGROUND

Visual localization is a way to accurately locate a location and a pose of a camera in the real world by using images or videos captured by the camera. Visual localization is a hot topic in the field of computer vision recently. Visual localization is of great significance in many fields such as augmented reality, interactive virtual reality, robot visual navigation, monitoring in public scenarios, and intelligent transportation.

The visual localization technology includes an unmanned aerial vehicle/satellite base map-based visual localization method. An unmanned aerial vehicle/satellite base map (e.g., an aerial model) is mainly obtained by performing tilt photography on scenarios by using an unmanned aerial vehicle, and performing structure from motion (SFM) three-dimensional reconstruction based on collected data; or is obtained by performing mesh model reconstruction on the scenarios by a satellite. According to the unmanned aerial vehicle/satellite base map—based visual localization method, an unmanned aerial vehicle/satellite base map is used for localization of an image or a video shot by a camera, to obtain a six-degree-of-freedom (6-DoF) pose of the camera in the unmanned aerial vehicle/satellite base map. This kind of visual localization technology can be used in visual localization in a large-scale scenario.

However, the unmanned aerial vehicle/satellite base map-based visual localization method has problems of a low localization success rate and low localization accuracy.

SUMMARY

This application provides a visual localization method and apparatus, to avoid a waste of resources and improve a success rate and accuracy of localization.

According to a first aspect, an embodiment of this application provides a visual localization method. The method may include: obtaining a captured first image; determining a first pose based on the first image and an aerial model; determining whether a ground model corresponding to the first pose exists in an aerial-ground model; and when the ground model corresponding to the first pose exists, determining a second pose based on the ground model. The aerial-ground model includes the aerial model and the ground model mapped to the aerial model, a coordinate system of the ground model is the same as a coordinate system of the aerial model, and localization accuracy of the second pose is higher than localization accuracy of the first pose.

In this embodiment, a server determines the first pose based on the first image and the aerial model, and determines whether the ground model corresponding to the first pose exists in the aerial-ground model. When the ground model corresponding to the first pose exists, the server may determine the second pose based on the ground model. The first pose is first determined based on the aerial model. In this case, fast, efficient, and coarse localization applicable to a large-scale scenario can be implemented to meet county/city-level visual localization requirements. In addition, fine visual localization is performed based on the ground model and the first pose, to implement hierarchical visual localization and improve accuracy and a success rate of visual localization.

In a possible embodiment, the determining a first pose based on the first image and an aerial model may include: determining an initial pose set based on location information and magnetometer angle deflection information of a terminal device corresponding to the first image; obtaining a skyline and semantic information of building lines and surfaces of the first image based on the first image; determining N initial poses from the initial pose set based on the skyline of the first image and the aerial model; and determining the first pose based on the semantic information of the building lines and surfaces, the N initial poses, and the aerial model, where N is an integer greater than 1.

The initial pose may also be referred to as a candidate pose.

In a possible embodiment, the method may further include: obtaining at least one captured second image, where there is an intersection between a photographing field of view of the first image and a photographing field of view of the at least one second image, for example, a viewing angle of the first image is different from that of the at least one second image; and determining N optimized initial poses based on the N initial poses, the skyline of the first image, at least one skyline of the at least one second image, and a relative pose between the first image and the at least one second image. The determining the first pose based on the semantic information of the building lines and surfaces, the N initial poses, and the aerial model includes: determining the first pose based on the semantic information of the building lines and surfaces, the N optimized initial poses, and the aerial model.

The relative pose between the first image and the at least one second image may be calculated according to a simultaneous localization and mapping (SLAM) algorithm.

In a possible embodiment, the method may further include: determining the N optimized initial poses based on the N initial poses and the relative pose between the first image and the at least one second image.

In a possible embodiment, the initial pose set includes a plurality of groups of initial poses, each group of initial poses includes initial location information and initial magnetometer angle deflection information, the initial location information falls within a first threshold range, the first threshold range is determined based on the location information of the terminal device, the initial magnetometer angle deflection information falls within a second threshold range, and the second threshold range is determined based on the magnetometer angle deflection information of the terminal device.

In a possible embodiment, a center value of the first threshold range is the location information of the terminal device, and a center value of the second threshold range is the magnetometer angle deflection information of the terminal device.

In a possible embodiment, the determining N initial poses from the initial pose set based on the skyline of the first image and the aerial model includes: performing skyline rendering based on each group of initial poses and the aerial model, to obtain a skyline corresponding to each group of initial poses; calculating a matching degree between the skyline of the first image and the skyline corresponding to each group of initial poses, to determine matching degrees of each group of initial poses; and determining the N initial poses from the initial pose set based on the matching degrees of each group of initial poses, where the N initial poses are first N initial poses sorted in descending order of the matching degrees in the initial pose set.

In a possible embodiment, the method may further include: constructing the aerial-ground model based on the aerial model and a plurality of third images for constructing the ground model.

The third image may include a skyline.

In a possible embodiment, the constructing the aerial-ground model based on the aerial model and a plurality of third images for constructing the ground model may further include: determining poses of the plurality of third images in the aerial model based on the aerial model; and determining the aerial-ground model based on the poses of the plurality of third images in the aerial model and poses of the plurality of third images in the ground model.

In a possible embodiment, the determining the aerial-ground model based on the poses of the plurality of third images in the aerial model and poses of the plurality of third images in the ground model includes: determining a plurality of coordinate conversion relationships based on the poses of the plurality of third images in the aerial model and the poses of the plurality of third images in the ground model; and determining semantic reprojection errors of the plurality of third images in the aerial model based on the plurality of coordinate conversion relationships respectively, and selecting an optimal coordinate conversion relationship from the plurality of coordinate conversion relationships as a coordinate conversion relationship of the aerial-ground model. The optimal coordinate conversion relationship is a coordinate conversion relationship that minimizes a semantic reprojection error.

In a possible embodiment, the method may further include: obtaining the plurality of third images and gravity information corresponding to all of the third images; and constructing the ground model based on the third images and the gravity information corresponding to all of the third images. The gravity information may be obtained through SLAM, and the gravity information is used for obtaining a roll angle and a pitch angle of a camera coordinate system.

The constructing the aerial-ground model based on the aerial model and a plurality of third images for constructing the ground model may include: constructing the aerial-ground model based on the ground model and the aerial model.

In a possible embodiment, the method may further include: determining virtual-object description information based on the first pose or the second pose; and sending the virtual-object description information to the terminal device, where the virtual-object description information is for displaying a corresponding virtual object on the terminal device.

According to a second aspect, an embodiment of this application provides a visual localization method. The method may include: capturing a first image, and displaying the first image on a user interface, where the first image includes a photographed skyline; sending the first image to a server; receiving first virtual-object description information sent by the server, where the first virtual-object description information is determined based on a first pose, the first pose is determined based on an aerial model, and a skyline and semantic information of building lines and surfaces of the first image; and superimposing and displaying, on the user interface, a virtual object corresponding to the first virtual-object description information.

In this embodiment, a terminal device sends the first image to the server, and receives the first virtual-object description information sent by the server. The terminal device displays, on the user interface, the virtual object corresponding to the first virtual-object description information. The first virtual-object description information is determined based on the first pose. The first pose is determined based on the skyline and the semantic information of the building lines and surfaces of the first image, and the aerial model. Localization accuracy of the first pose is higher than localization accuracy of a visual localization method in a conventional technology, and therefore the virtual object displayed based on the first pose is finer and more accurate.

In a possible embodiment, before the first image is captured, the method may further include: displaying first prompt information on the user interface. The first prompt information is for prompting a user to photograph the skyline.

In a possible embodiment, the method further includes: receiving an indication message sent by the server, where the indication message indicates that a ground model corresponding to the first pose exists in an aerial-ground model, the ground model is for determining a second pose, the aerial-ground model includes the aerial model and the ground model mapped to the aerial model, and a coordinate system of the ground model is the same as a coordinate system of the aerial model; and displaying second prompt information on the user interface based on the indication message, where the second prompt information is for prompting an available operation mode to the user.

In this embodiment, when the ground model corresponding to the first pose exists, the terminal device may display prompt information indicating that the ground model exists, so that the user chooses whether to calculate the second pose, that is, whether to perform more fine visual localization, to meet use requirements of different users.

In a possible embodiment, the method further includes: receiving a re-localization instruction input by the user on the user interface or by using a hardware button, and sending a localization optimization request message to the server in response to the re-localization instruction, where the localization optimization request message is for requesting to calculate the second pose; and receiving second virtual-object description information sent by the server, where the second virtual-object description information is determined based on the second pose, the second pose is determined based on the ground model corresponding to the first pose, and localization accuracy of the second pose is higher than localization accuracy of the first pose.

According to a third aspect, an embodiment of this application provides an aerial-ground model construction method. The method may include: obtaining a plurality of third images for constructing a ground model; determining poses, in an aerial model, of the plurality of third images for constructing the ground model; and aligning the aerial model with the ground model based on the poses of the plurality of third images in the aerial model and poses of the plurality of third images in the ground model, to obtain an aerial-ground model. The aerial-ground model includes the aerial model and the ground model mapped to the aerial model, and a coordinate system of the ground model is the same as a coordinate system of the aerial model.

The third image may include a skyline.

In a possible embodiment, the aligning the aerial model with the ground model based on the poses of the plurality of third images in the aerial model and poses of the plurality of third images in the ground model to obtain an aerial-ground model includes: determining a plurality of coordinate conversion relationships based on the poses of the plurality of third images in the aerial model and the poses of the plurality of third images in the ground model; determining semantic reprojection errors of the plurality of third images in the aerial model based on the plurality of coordinate conversion relationships respectively, and selecting an optimal coordinate conversion relationship from the plurality of coordinate conversion relationships as a coordinate conversion relationship of the aerial-ground model, where the coordinate conversion relationship of the aerial-ground model is for aligning the aerial model with the ground model; and mapping the ground model to the aerial model based on the coordinate conversion relationship of the aerial-ground model, to obtain the aerial-ground model. The optimal coordinate conversion relationship is a coordinate conversion relationship that minimizes a semantic reprojection error.

In a possible embodiment, the method may further include: obtaining the plurality of third images and gravity information corresponding to all of the third images; and constructing the ground model based on the third images and the gravity information corresponding to all of the third images.

According to a fourth aspect, an embodiment of this application provides a visual localization apparatus. The visual localization apparatus may be used as a server or an internal chip of the server, and the visual localization apparatus is configured to perform the visual localization method in any one of the first aspect or the possible embodiments of the first aspect. In embodiments, the visual localization apparatus includes modules or units configured to perform the visual localization method in any one of the first aspect or the possible embodiments of the first aspect, for example, a transceiver module or unit and a processing module or unit.

According to a fifth aspect, an embodiment of this application provides a visual localization apparatus. The visual localization apparatus may be used as a server or an internal chip of the server, and the visual localization apparatus includes a memory and a processor. The memory is configured to store instructions, and the processor is configured to execute the instructions stored in the memory. In addition, execution of the instructions stored in the memory enables the processor to perform the visual localization method in any one of the first aspect or the possible embodiments of the first aspect.

According to a sixth aspect, an embodiment of this application provides a computer-readable storage medium. The computer-readable storage medium stores a computer program. When the program is executed by a processor, the method in any one of the first aspect or the possible embodiments of the first aspect is implemented.

According to a seventh aspect, an embodiment of this application provides a visual localization apparatus. The visual localization apparatus may be used as a terminal device, and the visual localization apparatus is configured to perform the visual localization method in any one of the second aspect or the possible embodiments of the second aspect. In embodiments, the visual localization apparatus may include modules or units configured to perform the visual localization method in any one of the second aspect or the possible embodiments of the second aspect, for example, a transceiver module or unit and a processing module or unit.

According to an eighth aspect, an embodiment of this application provides a visual localization apparatus. The visual localization apparatus may be used as a terminal device, and the visual localization apparatus includes a memory and a processor. The memory is configured to store instructions, and the processor is configured to execute the instructions stored in the memory. In addition, execution of the instructions stored in the memory enables the processor to perform the visual localization method in any one of the second aspect or the possible embodiments of the second aspect.

According to a ninth aspect, an embodiment of this application provides a computer-readable storage medium. The computer-readable storage medium stores a computer program. When the program is executed by a processor, the method in any one of the second aspect or the possible embodiments of the second aspect is implemented.

According to a tenth aspect, an embodiment of this application provides a visual localization apparatus. The visual localization apparatus may be used as a server or an internal chip of the server, and the visual localization apparatus is configured to perform the aerial-ground model construction method in any one of the third aspect or the possible embodiments of the third aspect. In embodiments, the visual localization apparatus may include modules or units configured to perform the aerial-ground model construction method in any one of the third aspect or the possible embodiments of the third aspect, for example, an obtaining module or unit and a processing module or unit.

According to an eleventh aspect, an embodiment of this application provides a visual localization apparatus. The visual localization apparatus may be used as a server or an internal chip of the server, and the visual localization apparatus includes a memory and a processor. The memory is configured to store instructions, and the processor is configured to execute the instructions stored in the memory. In addition, execution of the instructions stored in the memory enables the processor to perform the aerial-ground model construction method in any one of the third aspect or the possible embodiments of the third aspect.

According to a twelfth aspect, an embodiment of this application provides a computer-readable storage medium. The computer-readable storage medium stores a computer program. When the program is executed by a processor, the method in any one of the third aspect or the possible embodiments of the third aspect is implemented.

According to a thirteenth aspect, an embodiment of this application provides a computer program product. The computer program product includes a computer program. When being executed by a computer or a processor, the computer program is for performing the method in any one of the first aspect or the possible embodiments of the first aspect, is for performing the method in any one of the second aspect or the possible embodiments of the second aspect, or is for performing the method in any one of the third aspect or the possible embodiments of the third aspect.

According to a fourteenth aspect, an embodiment of this application provides a visual localization method. The method may include: obtaining a first image and a second image that are captured; determining an initial pose set based on location information and magnetometer angle deflection information of a terminal device corresponding to the first image; obtaining a skyline and semantic information of building lines and surfaces of the first image based on the first image; obtaining a skyline and semantic information of building lines and surfaces of the second image based on the second image; obtaining a relative pose between the first image and the second image based on SLAM; determining N optimized candidate poses from the initial pose set based on the skyline of the first image, the skyline of the second image, the relative pose, and an aerial model; and determining a first pose of the first image based on the semantic information of the building lines and surfaces in the first image, the semantic information of the building lines and surfaces in the second image, the N optimized candidate poses, and the aerial model, where N is an integer greater than 1.

In a possible embodiment, a viewing angle of the first image is different from that of the second image. The third image may include a vegetation skyline. The semantic information of the building lines and surfaces may include upper edge information of a building.

In a possible embodiment, the initial pose set includes a plurality of groups of initial poses, each group of initial poses includes initial location information and initial magnetometer angle deflection information, the initial location information falls within a first threshold range, the first threshold range is determined based on the location information of the terminal device, the initial magnetometer angle deflection information falls within a second threshold range, and the second threshold range is determined based on the magnetometer angle deflection information of the terminal device.

In a possible embodiment, a center value of the first threshold range is the location information of the terminal device, and a center value of the second threshold range is the magnetometer angle deflection information of the terminal device.

In a possible embodiment, the determining N optimized candidate poses from the initial pose set based on the skyline of the first image, the skyline of the second image, the relative pose, and an aerial model includes: performing skyline rendering based on each group of initial poses and the aerial model, to obtain a skyline corresponding to each group of initial poses; calculating a matching degree between the skyline of the first image and the skyline corresponding to each group of initial poses; determining a weight of each group of initial poses based on the matching degree of the skyline, the skyline of the second image, and the relative pose; and determining N optimized candidate poses from the initial pose set based on the weight of each group of initial poses. The N optimized candidate poses are first N poses sorted in ascending order of weights in the initial pose set.

In a possible embodiment, the determining a first pose of the first image based on the semantic information of the building lines and surfaces in the first image, the semantic information of the building lines and surfaces in the second image, the N optimized candidate poses, and the aerial model may include: calculating, based on the N optimized candidate poses, the semantic information of the building lines and surfaces of the first image, and the aerial model, a semantic reprojection error corresponding to each of the optimized candidate poses; and selecting a pose with a smallest reprojection error as the first pose of the first image.

In a possible embodiment, the method may further include: determining whether a ground model corresponding to the first pose exists in an aerial-ground model; and when the ground model corresponding to the first pose exists, determining a second pose based on the ground model. The aerial-ground model includes the aerial model and the ground model mapped to the aerial model, a coordinate system of the ground model is the same as a coordinate system of the aerial model, and localization accuracy of the second pose is higher than localization accuracy of the first pose.

In a possible embodiment, the method may further include: determining first virtual-object description information based on the first pose when no ground model corresponding to the first pose exists; and sending the first virtual-object description information to the terminal device. The first virtual-object description information is for displaying a corresponding virtual object on the terminal device.

In a possible embodiment, the method may further include: determining second virtual-object description information based on the second pose when the ground model corresponding to the first pose exists; and sending the second virtual-object description information to the terminal device. The second virtual-object description information is for displaying a corresponding virtual object on the terminal device.

According to a fifteenth aspect, an embodiment of this application provides an aerial-ground model construction method. The method may include: obtaining a plurality of third images and gravity information corresponding to all of the third images; constructing a ground model based on the third images; and constructing an aerial-ground model based on the aerial model and the ground model. At least one of the plurality of third images includes a skyline, the gravity information may be obtained through SLAM, and the gravity information is used for obtaining a roll angle and a pitch angle of a camera coordinate system.

The foregoing model may also be referred to as a map, for example, an aerial-ground map or an aerial map.

In a possible embodiment, the constructing an aerial-ground model based on the aerial model and the ground model includes: determining a pose of a third image in the aerial model based on the aerial model; and determining the aerial-ground model based on the pose of the third image in the aerial model and a pose of the third image in the ground model, where the third image is an image in the plurality of third images that includes a skyline.

In a possible embodiment, the determining the aerial-ground model based on the pose of the third image in the aerial model and a pose of the third image in the ground model, where the third image is an image in the plurality of third images that includes a skyline, includes: determining a plurality of coordinate conversion relationships based on the pose, in the aerial model, of the third image in the plurality of third images that includes the skyline and a pose, in the ground model, of the third image in the plurality of third images that includes the skyline;

determining semantic reprojection errors of building lines and surfaces of the plurality of third images in the aerial model based on the plurality of coordinate conversion relationships respectively, and selecting an optimal coordinate conversion relationship from the plurality of coordinate conversion relationships, where the optimal coordinate conversion relationship is a coordinate conversion relationship that minimizes a semantic reprojection error of the building lines and surfaces; and converting a coordinate system of the ground model to a coordinate system of the aerial model based on the optimal coordinate system conversion relationship, to obtain the aerial-ground model, where the aerial-ground model includes the aerial model and the ground model whose coordinate system is mapped to the aerial model, and the coordinate system of the ground model is the same as the coordinate system of the aerial model.

According to the visual localization method and apparatus in embodiments of this application, visual localization is performed based on the skyline and the semantic information of the building lines and surfaces of the first image and/or the ground model in the aerial-ground model. This can improve a success rate and accuracy of visual localization.

DESCRIPTION OF EMBODIMENTS

Terms such as "first" and "second" in embodiments of this application are only used for distinguishing and description, but cannot be understood as an indication or implication of relative importance, or an indication or implication of an order. In addition, terms "including" and "having" and any variant thereof are intended to cover non-exclusive inclusion, for example, include a series of operations or units. A method, system, product, or device is not necessarily limited to those operations or units that are expressly listed, but may include other operations or units that are not expressly listed or inherent to such a process, method, product, or device.

It should be understood that, in this application, "at least one" means one or more, and "a plurality of" means two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" usually represents an "or" relationship between the associated objects. "At least one of the following items" or a similar expression thereof means any combination of these items, including a single item or any combination of a plurality of items. For example, at least one of a, b, or c may represent a, b, c, "a and b", "a and c", "b and c", or "a, b, and c", where a, b, and c may be singular or plural.

Terms used in embodiments of this application are first explained.

Visual localization is used in a visual localization system to locate a pose of a camera coordinate system of a terminal device in a real world coordinate system, to implement seamless merge between the real world and the virtual world.

A query image is an image captured by the terminal device and is a current image frame for visual localization.

Figure 1A:
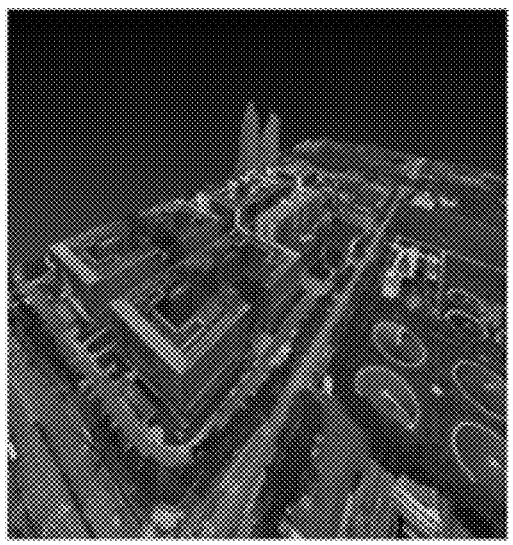
FIG. 1A and FIG. 1B are schematic diagrams of an aerial model according to an embodiment of this application.
Figure 1B:
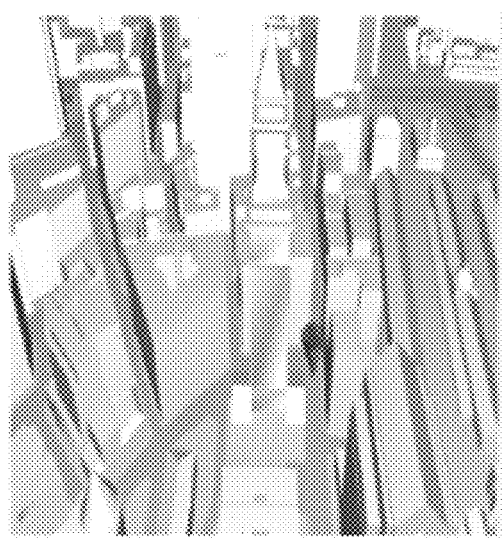
Figure 2A:
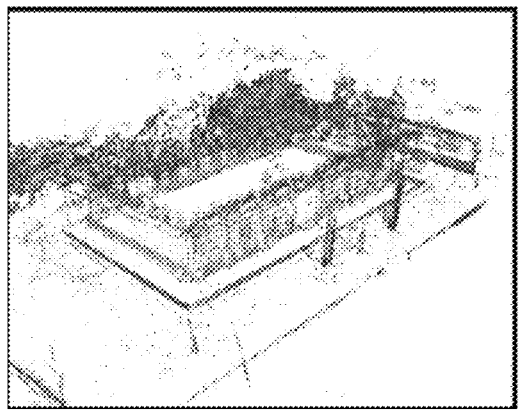
FIG. 2A is a schematic diagram of a ground model according to an embodiment of this application.
Figure 2B:
FIG. 2B is a schematic diagram of an aerial model according to an embodiment of this application.

An aerial model is also referred to as an unmanned aerial vehicle/satellite base map. The aerial model may be mainly obtained in the following manner: (1) performing tilt photography on scenarios by using an unmanned aerial vehicle, and performing structure from motion (SFM) three-dimensional reconstruction based on data collected through photographing, as shown in FIG. 1A and FIG. 2B; or (2) performing mesh model reconstruction on the scenarios by using a satellite, as shown in FIG. 1B.

A ground model is also referred to as a map created based on the terminal device. The ground model is obtained by collecting data of scenarios by the terminal device, and performing SFM three-dimensional reconstruction based on the collected data. For example, the ground model may be shown in FIG. 2A.

Figure 2C:
FIG. 2C and FIG. 2D are schematic diagrams of an aerial-ground model according to an embodiment of this application.
Figure 2D:
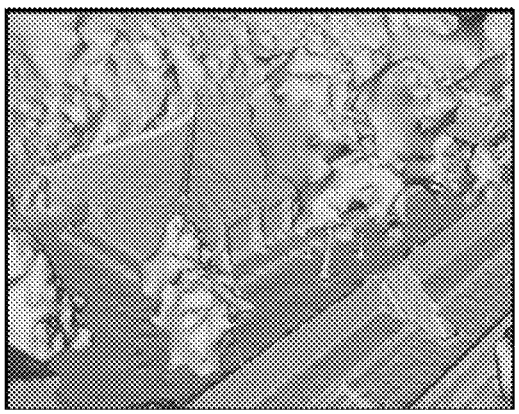

An aerial-ground model may also be referred to as an aerial-ground map. The aerial model and the ground model are aligned through similar conversion, and the two models are unified into a global coordinate system, as shown in FIG. 2C and FIG. 2D. FIG. 2C shows a point cloud of the aerial-ground model, and FIG. 2D shows a reconstructed mesh (Reconstructed Mesh) based on the point cloud of the aerial-ground model.

Aerial model-based visual localization is a way to locate a 6-DoF pose of a camera coordinate system of the terminal device in the aerial model based on the aerial model.

Ground model-based visual localization is a way to locate a 6-DoF pose of the camera coordinate system of the terminal device in the ground model based on the ground model.

A six-degree-of-freedom (DoF) pose includes coordinates (x, y, z) and angle deflection around three coordinate axes. The angle deflection around the three coordinate axes is yaw, pitch, and roll.

Embodiments of this application relate to a terminal device. The terminal device may be a mobile phone, a tablet personal computer, a media player, a smart television, a notebook computer, a personal digital assistant (PDA), a personal computer (PC), a smartwatch, a wearable device such as augmented reality (AR) glasses, a vehicle-mounted device, an Internet of things (IoT) device, or the like. This is not limited in this embodiment of this application.

Figure 3:
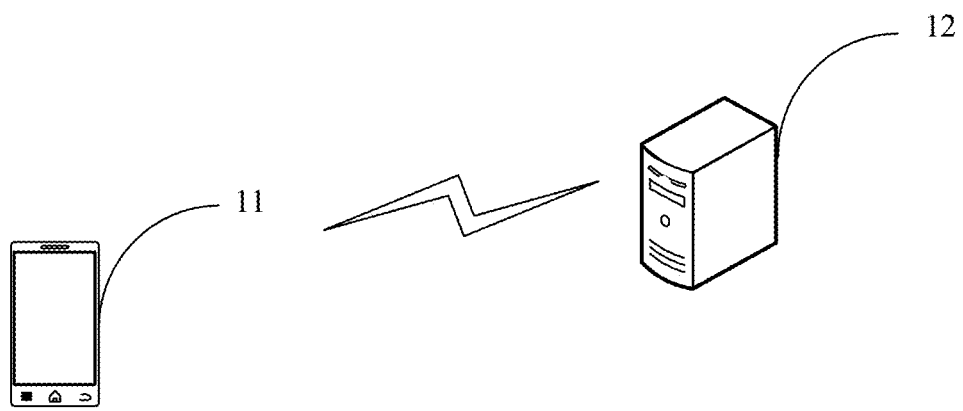
FIG. 3 is a schematic diagram of an application scenario according to an embodiment of this application.

FIG. 3 is a schematic diagram of an application scenario according to an embodiment of this application. As shown in FIG. 3, the application scenario may include a terminal device 11 and a server 12. For example, the terminal device 11 may communicate with the server 12, and the server 12 may provide a visual localization service for the terminal device, and push virtual-object description information to the terminal device 11 based on the visual localization service, so that the terminal device can present a corresponding virtual object. The virtual object may be a virtual roadmap, a virtual person, or the like. An embodiment of this application provides a visual localization method, to improve a success rate and accuracy of visual localization. In this way, corresponding virtual-object description information is accurately pushed to a terminal device. For specific explanations and descriptions of the visual localization method, refer to the following embodiments.

Figure 4A:
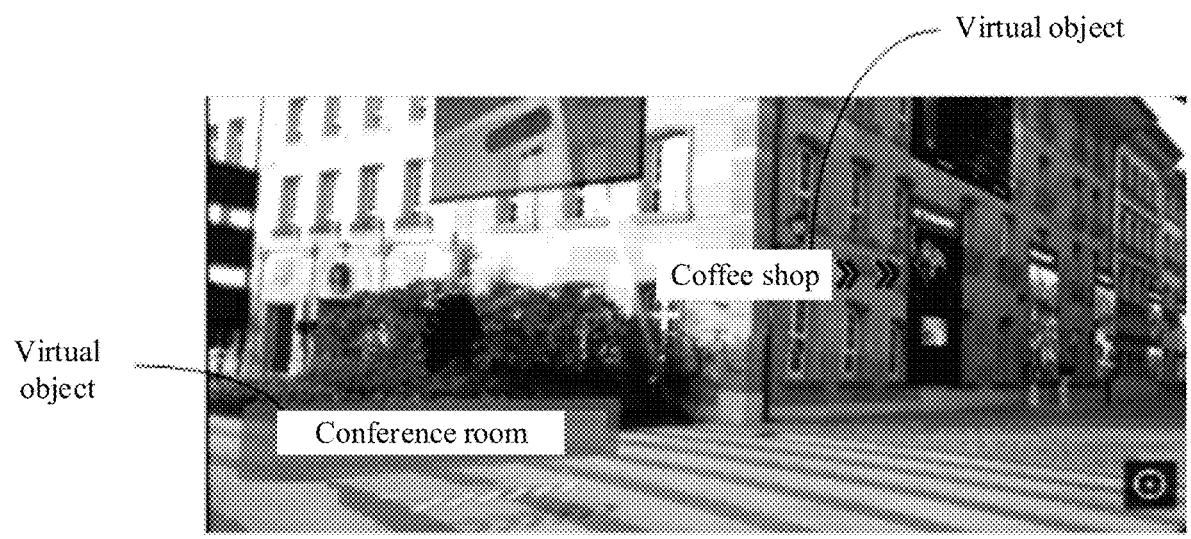
FIG. 4A is a schematic diagram of a user interface displayed on a screen of a terminal device according to an embodiment of this application.
Figure 4B:
FIG. 4B is a schematic diagram of a user interface displayed on a screen of a terminal device according to an embodiment of this application.
Figure 4C:
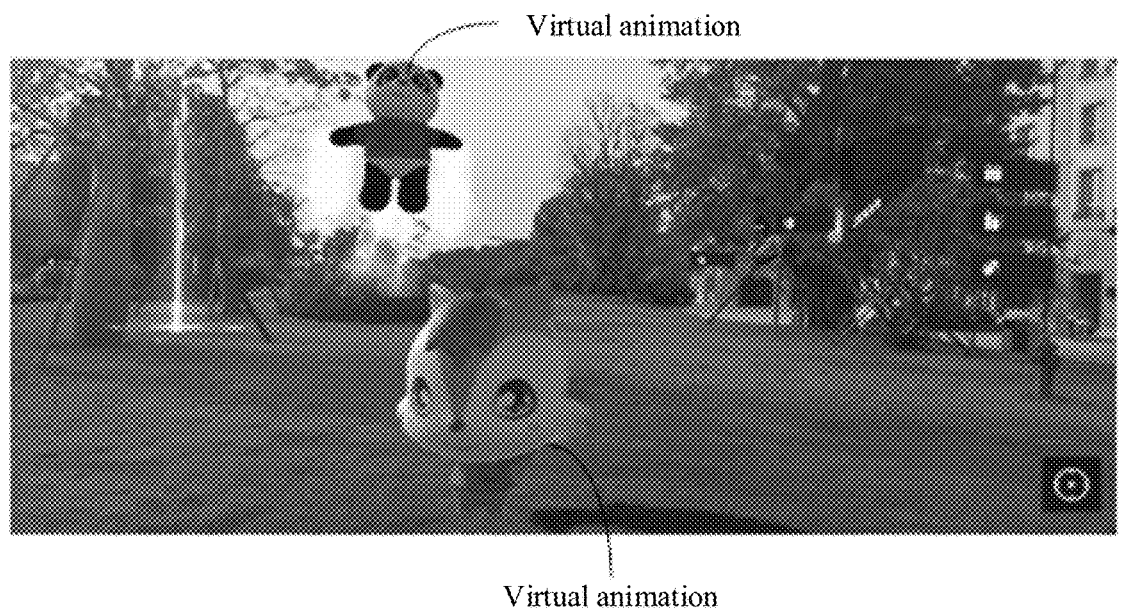
FIG. 4C is a schematic diagram of a user interface displayed on a screen of a terminal device according to an embodiment of this application.

The visual localization method in this embodiment of this application may be applied to fields in which a location and a pose of a camera of a terminal device need to be located, such as AR navigation, AR human-computer interaction, assisted driving, and self driving. For example, in an extra large scale scenario visual navigation system, visual navigation is guiding a user to a specific destination through interaction such as augmented reality. The user may see information such as a suggested walking direction and a distance from a destination on a screen of the terminal device in real time. As shown in FIG. 4A, a virtual object is a walking direction to a conference room displayed on the screen, that is, the walking direction and the like are displayed to the user through augmented reality. For another example, for extra large scenario AR game interaction shown in FIG. 4B and FIG. 4C, AR content may be displayed at a specific fixed geographical location during AR game interaction, and corresponding virtual objects (for example, virtual persons shown in FIG. 4B or virtual animations shown in FIG. 4C) may be displayed on the screen of the user's terminal device by using the visual localization method in this embodiment of this application. The user may guide the virtual objects to interact with the real world by interacting with the virtual object through tapping/sliding on the screen of the terminal device.

It should be noted that a camera is usually disposed on the terminal device 11, and the terminal device 11 may photograph a scenario by using the camera. Descriptions are provided by using an example in which the server 12 is one server. This is not limited in this application. For example, the server 12 may alternatively be a server cluster including a plurality of servers.

Figure 5:
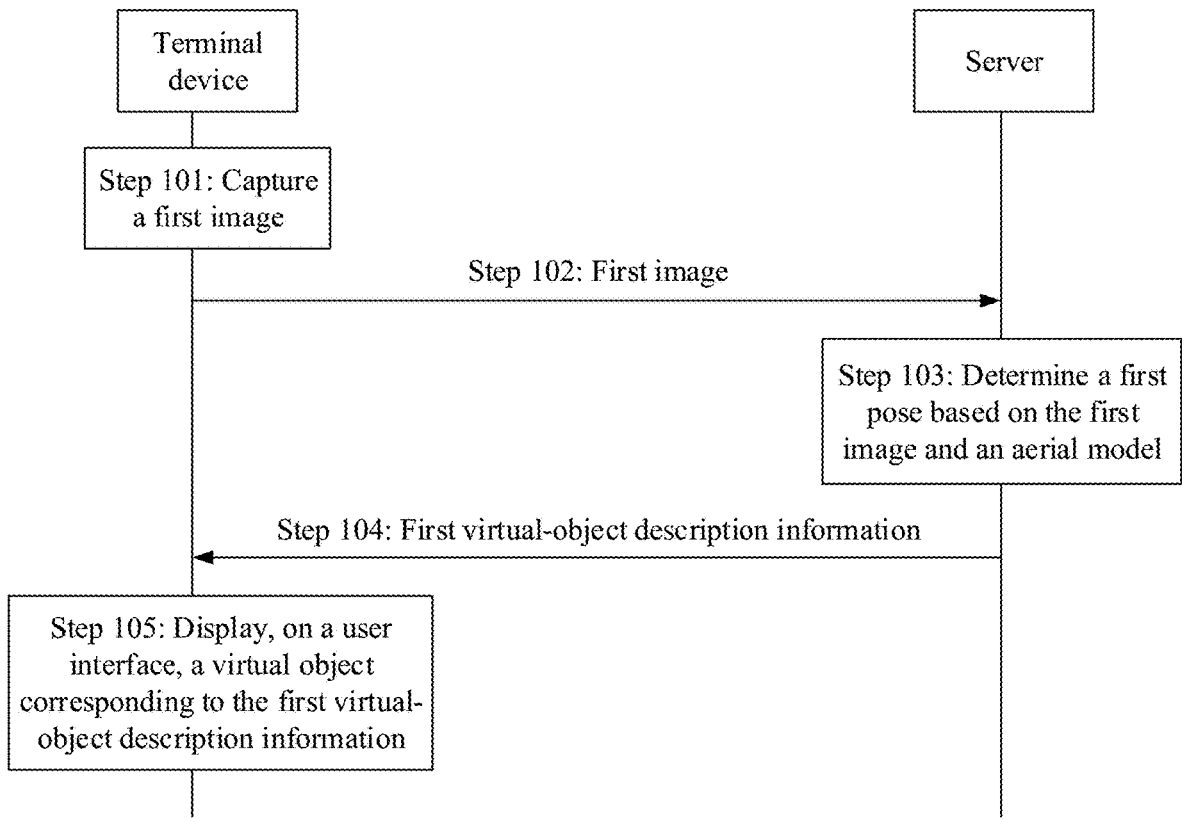
FIG. 5 is a flowchart of a visual localization method according to an embodiment of this application.

FIG. 5 is a flowchart of a visual localization method according to an embodiment of this application. A terminal device and a server are used in the method in this embodiment. As shown in FIG. 5, the method in this embodiment may include the following operations.

Operation 101: The terminal device captures a first image.

The terminal device captures the first image by using a camera. The first image may be the foregoing described query image.

For example, the terminal device is a smartphone. The smartphone may start a photographing function by triggering an application program, to capture the first image. For example, first images may be captured periodically, for example, every 2 seconds or every 30 seconds, or the first images may be captured when a preset capture condition is met. The preset capture condition may be that GPS data of the smartphone falls within a preset range. The following operations may be performed for each first image captured by the terminal device, to implement visual localization.

Operation 102: The terminal device sends the first image to the server.

The server receives the first image sent by the terminal device.

Operation 103: The server determines a first pose based on the first image and an aerial model.

A manner of determining the first pose in this embodiment of this application may be referred to as an aerial model-based improved visual localization manner. The first pose can be effectively determined based on a skyline and semantic information of building lines and surfaces of the first image in the aerial model-based improved visual localization manner. This improves a success rate and accuracy of localization.

For example, the server may determine N initial poses based on the skyline of the first image, and determine the first pose based on the semantic information of the building lines and surfaces of the first image, the N initial poses, and the aerial model. For example, the server traverses the N initial poses, calculates semantic reprojection errors of the N initial poses, and determines the first pose based on the semantic reprojection errors. A manner of calculating the semantic reprojection errors of the N initial poses may be as follows: separately rendering edges and surfaces of a building based on the N initial poses and the aerial model, to obtain a semantic segmentation map obtained through rendering; and calculating a matching error between the semantic segmentation map obtained through rendering and the semantic information of the building lines and surfaces (for example, a semantic segmentation map) of the first image, where the matching error is a semantic reprojection error. N is an integer greater than 1.

In an embodiment, an initial pose set is determined based on location information and magnetometer angle deflection information of the terminal device corresponding to the first image. The skyline and the semantic information of the building lines and surfaces of the first image are obtained based on the first image. The N initial poses are determined from the initial pose set based on the skyline of the first image and the aerial model. The first pose is determined based on the semantic information of the building lines and surfaces, the N initial poses, and the aerial model. For specific embodiments, refer to specific descriptions of an embodiment shown in FIG. 6.

In some embodiments, the server may further receive at least one second image captured by the terminal device. The server may optimize the N initial poses based on the at least one second image to determine N optimized initial poses, and determine the first pose based on the semantic information of the building lines and surfaces of the first image and the N optimized initial poses. That is, the server calculates a pose of the first image with assistance of a plurality of frames of images. There is an intersection between a photographing field of view of the at least one second image and a photographing field of view of the first image.

Optionally, there may be no intersection between a photographing field of view of the at least one second image and a photographing field of view of the first image. In other words, the viewing angle of the at least one second image is different from that of the first image.

Operation 104: The server determines first virtual-object description information based on the first pose, and sends the first virtual-object description information to the terminal device.

For example, the server may determine the first virtual-object description information based on the first pose. The first virtual-object description information is for displaying a corresponding virtual object on the terminal device, for example, a walking guide icon shown in FIG. 4A. The guide icon is displayed in an actual scenario in the real world, that is, on the street as shown in FIG. 4A.

Operation 105: The terminal device displays, on a user interface, a virtual object corresponding to the first virtual-object description information.

The terminal device displays, on the user interface, the virtual object corresponding to the first virtual-object description information. The actual scenario in the real world is displayed on the user interface, and the virtual object may be displayed on the user interface through augmented reality.

In this embodiment, the terminal device sends the first image to the server; the server determines the first pose based on the skyline and the semantic information of the building lines and surfaces of the first image, and the aerial model; the server determines the first virtual-object description information based on the first pose and sends the first virtual-object description information to the terminal device; and the terminal device displays, on the user interface, the virtual object corresponding to the first virtual-object description information, to determine the first pose based on the skyline and the semantic information of the building lines and surfaces of the first image. This can improve a success rate and accuracy of visual localization.

Further, in this embodiment, respective advantages of aerial model-based visual localization and visual localization based on fine map creation performed by a mobile phone can be effectively combined, an aerial-ground map is created, and hierarchical visual localization is performed. This effectively balances capture costs and localization accuracy in a large scenario.

Figure 6:
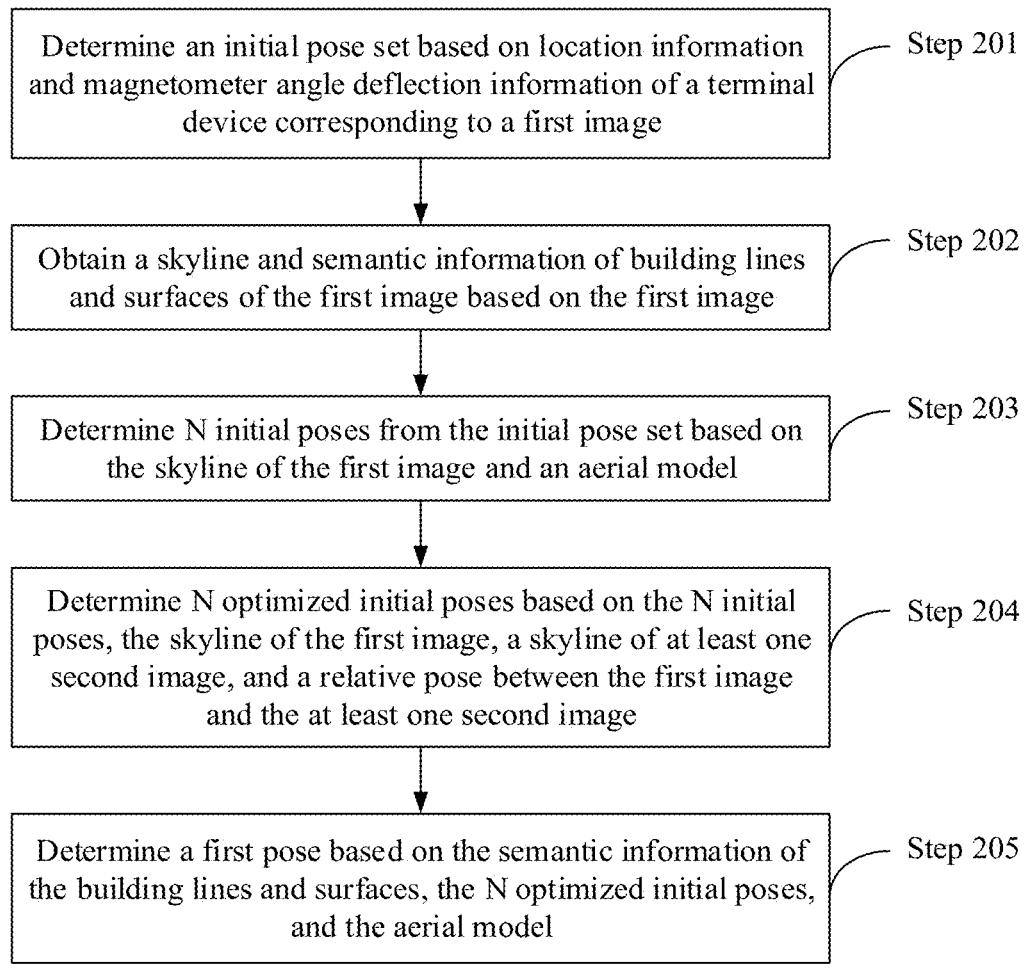
FIG. 6 is a flowchart of an aerial model-based improved visual localization (Geo-localization) method according to an embodiment of this application.

The following describes a specific embodiment of operation 103 by using an embodiment shown in FIG. 6.

FIG. 6 is a flowchart of an aerial model-based improved visual localization (e.g., a geo-localization) method according to this embodiment of this application. This embodiment may be performed by a server or an internal chip of the server. As shown in FIG. 6, the method in this embodiment may include the following operations.

Operation 201: Determine an initial pose set based on location information and magnetometer angle deflection information of a terminal device corresponding to a first image.

The location information of the terminal device corresponding to the first image may be global positioning system (GPS) information, and the magnetometer angle deflection information may be a yaw angle. The location information and the magnetometer angle deflection information may be location information and magnetometer angle deflection information that are obtained when the terminal device captures the first image, and may be obtained by a wireless communication module of the terminal device and a magnetometer.

The initial pose set may include a plurality of groups of initial poses, each group of initial poses may include initial location information and initial magnetometer angle deflection information, the initial location information falls within a first threshold range, the first threshold range is determined based on the location information of the terminal device, the initial magnetometer angle deflection information falls within a second threshold range, and the second threshold range is determined based on the magnetometer angle deflection information of the terminal device.

For example, the terminal device may construct a location candidate set (T) and a yaw angle candidate set (Y) based on the location information and the magnetometer angle deflection information of the terminal device corresponding to the first image, respectively. The location candidate set (T) includes a plurality of pieces of initial location information. The yaw angle candidate set (Y) includes a plurality of yaw angles. One piece of initial location information in T and one yaw angle in Y may constitute a group of initial poses, so that the plurality of groups of initial poses may be constituted.

The location candidate set (T) is constructed as follows. In an area range, a location point is selected as initial location information in the location candidate set (T) at an interval of a first preset interval. The area range may be a range in which the location information (x, y) of the terminal device corresponding to the first image is used as the circle center, and a radius is a first threshold. That is, a center value of the first threshold range is the location information of the terminal device. For example, the first threshold may be 30 meters or 35 meters. The first preset interval may be one meter.

The yaw angle candidate set (Y) is constructed as follows. In an angle range, an angle is selected as a yaw angle in the yaw angle candidate set (Y) at an interval of a second preset interval. The angle range may be a range between a minus second threshold and a plus second threshold of the yaw angle of the terminal device corresponding to the first image. That is, a center value of the second threshold range is the magnetometer angle deflection information of the terminal device. For example, the second threshold may be 90 degrees or 85 degrees. The second preset interval may be 0.1 degree.

The foregoing embodiments of constructing the location candidate set (T) and the yaw angle candidate set (Y) are examples for description. This is not limited in this embodiment of this application.

Operation 202: Obtain a skyline and semantic information of building lines and surfaces of the first image based on the first image.

In this operation, different categories of semantic segmentation of may be performed on the first image, and the skyline of the first image is extracted. The different categories may include vegetation, buildings, the sky, and the like. Semantic segmentation of horizontal and vertical building lines and surfaces may be performed on the first image to obtain the semantic information of the building lines and surfaces of the first image. The horizontal and vertical building lines and surfaces include edges (horizontal edges and vertical edges) and surfaces of the building.

Figure 7A:
FIG. 7A is a semantic segmentation map according to an embodiment of this application.

For example, FIG. 7A is used as an example for description. The first image (for example, an image on the leftmost side of FIG. 7A) is input to a first semantic segmentation network, to output a semantic segmentation map (for example, an image in the middle of FIG. 7A), where the first semantic segmentation network is configured to distinguish between buildings, the sky, vegetation, the ground, and the like. A skyline is extracted based on the semantic segmentation map, to obtain the skyline of the first image (for example, an image on the rightmost side of FIG. 7A).

The first semantic segmentation network may be any neural network, for example, a convolutional neural network.

The first semantic segmentation network may be obtained through training based on training data. That is, the first semantic segmentation network obtained training based on the training data is used to distinguish between the buildings, the sky, the vegetation, the ground, and the like. A semantic segmentation task is a dense pixel-level classification task. A training policy used during training is a standard cross-entropy loss used to measure a difference between a predicted value and a label value. A prediction effect of the network is improved by minimizing the loss:

$$L = \frac{1}{N}\sum_i -\log\left(\frac{e^{p_i}}{\sum_j e^{p_j}}\right)$$

N represents all pixels, $p_i$ represents a probability that a predicted value of any pixel and ground truth are of a same category, and $p_j$ represents a predicted value of each category in any pixel. In the semantic segmentation network in this embodiment of this application, a total of two parts of losses are calculated: a cross entropy $L_{final}$ between a final output and a label map, that is, L in the foregoing formula; and a regularization loss $L_{weight}$. In this embodiment of this application, overfitting is mitigated by reducing features or penalizing weights of unimportant features. Regularization helps penalize a weight of a feature, that is, the weight of the feature also becomes a part of a loss function of a model. Therefore, the overall loss of the semantic segmentation network is as follows:

$$L_{total} = L_{final} + \gamma L_{weight}$$

$\gamma$ is a hyperparameter used to control importance of the loss. For example, a value of $\gamma$ is set to 1.

A semantic segmentation network model is adjusted repeatedly and iteratively, to minimize the total loss (Loss) of the semantic segmentation network, so as to obtain the first semantic segmentation network through training.

Figure 7B:
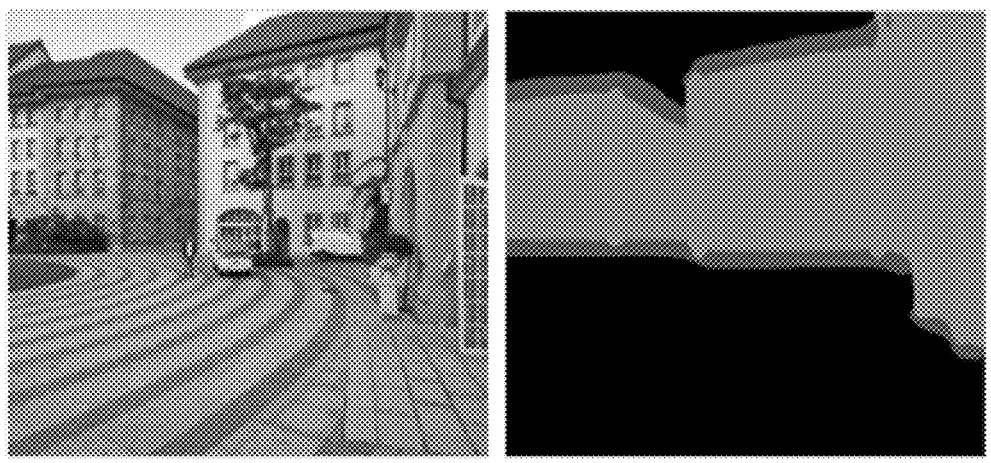
FIG. 7B is another semantic segmentation map according to an embodiment of this application.

For example, FIG. 7B is used as an example for description. The first image (for example, an image on the leftmost side of FIG. 7B) is input to a second semantic segmentation network, to output the semantic information of the building lines and surfaces, for example, a building semantic segmentation map (for example, an image on the rightmost side of FIG. 7B), where the second semantic segmentation network is configured to distinguish between a horizontal building line, a vertical building line, building surfaces, and the like in the image.

The second semantic segmentation network may be any neural network, for example, a convolutional neural network.

The second semantic segmentation network may be obtained through training based on training data. That is, the second semantic segmentation network obtained through training based on the training data is used to distinguish between the horizontal building line, the vertical building line, the building surfaces, and the like. A specific training manner may be similar to a training manner of the first semantic segmentation network, and details are not described herein again.

It should be noted that, after the skyline of the first image is obtained in the foregoing manner, the skyline may be further adjusted. For example, the skyline is rotated by a specific angle in a gravity direction. The angle may be determined according to a simultaneous localization and mapping (SLAM) algorithm, for example, an angle calculated according to the SLAM algorithm. The angle is for representing a relative relationship between a camera coordinate system of the terminal device and the gravity direction.

Operation 203: Determine N initial poses from the initial pose set based on the skyline of the first image and an aerial model.

For example, all elements in the location candidate set (T) and all elements in the yaw angle candidate set (Y) may be traversed to constitute a plurality of groups of initial poses in the initial pose set. Each group of initial poses may include initial location information and initial magnetometer angle deflection information. Skyline rendering is performed on each group of initial poses based on the aerial model, to obtain a skyline corresponding to each group of initial poses. A matching degree between the skyline of the first image and the skyline corresponding to each group of initial poses is calculated, to determine matching degrees of each group of initial poses. The N initial poses are determined from the initial pose set based on the matching degrees of each group of initial poses. The N initial poses are N initial poses sorted in descending order of the matching degrees in the initial pose set.

The matching degree between the skyline of the first image and the skyline corresponding to each group of initial poses may be calculated, in some embodiments, as follows: performing, by using a sliding window, matching (measuring an L2 distance or another distance) between the skyline of the first image and the skyline that corresponds to the initial poses and that is obtained through rendering, to determine the matching degree.

In this embodiment of this application, applying the N initial poses to visual localization can improve a success rate of visual localization.

For example, a group of initial poses are expressed as (($x_1$, $y_1$), yaw1). Skyline rendering is performed on the initial poses based on the aerial model, to obtain a skyline corresponding to the initial poses. Matching between the skyline of the first image and the skyline corresponding to the initial poses is performed by using a sliding window, to determine matching degrees of the initial poses.

Operation 204: Determine N optimized initial poses based on the N initial poses, the skyline of the first image, at least one skyline of at least one second image, and a relative pose between the first image and the at least one second image.

Operation 205 may be immediately performed after operation 203, to determine a first pose based on the semantic information of the building lines and surfaces, the N initial poses, and the aerial model. As an optional operation, operation 204 of performing multi-frame joint optimization on the N initial poses determined in operation 203 may be performed after operation 203, to obtain the N optimized initial poses.

A possible embodiment of multi-frame joint optimization may be: optimizing the N initial poses in operation 203 based on the at least one second image. For explanations and descriptions of the at least one second image, refer to operation 103 in the embodiment shown in FIG. 5. Details are not described herein again. Two second images are used as an example for description in this embodiment. $I_0$ represents the first image, and $I_1$ and $I_2$ represent two second images. For example, N initial poses of $I_0$ are optimized based on skylines of the three images and relative poses between the three images calculated through SLAM.

A relationship between the relative poses between the three images may be calculated through SLAM, and is denoted as $T_{I_{012}}$. $T_{I_{012}}$ represents a pose conversion relationship of $I_1$ and $I_2$ relative to $I_0$. A pose of $I_0$ may be calculated with assistance of $I_1$ and $I_2$.

For example, there is a specific intersection between photographing fields of view of the three images, and an overall field of view constituted by the three images is larger, to more accurately determine the first pose of the first image. In embodiments, an optimization manner may be as follows:

The N initial poses of $I_0$ obtained in operation 203 are denoted as $Pinitial_{I_0}^n$ (n=0, ..., N-1). Poses of $I_1$ and $I_2$ in the aerial model are calculated based on $T_{I_{012}}$, skyline rendering is separately performed based on a pose of $I_1$ and a pose of $I_2$ to obtain a skyline of $I_1$ obtained through rendering and a skyline of $I_2$ obtained through rendering, a matching degree between the skyline of $I_1$ obtained through rendering and a skyline of $I_1$ is calculated, a matching degree between the skyline of $I_2$ obtained through rendering and a skyline of $I_2$ is calculated, and a sum of the matching degrees of the skylines of $I_0$, $I_1$ and $I_2$ is denoted as $M_{sum}^{I_0}$, to measure estimation accuracy of $Pinitial_{I_0}^n$ (n=0, ..., N-1). For example, when n=3, corresponding $M_{sum}^{I_0}$ is highest. In this case, a corresponding initial pose $Pinitial_{I_0}^3$ is superior to another initial pose.

The same processing manner as the foregoing manner is used for $I_1$ and $I_2$. For example, if the obtained N initial poses of $I_1$ are denoted as $Pinitial_{I_1}^n$ (n=0, ..., N-1), the N initial poses of $I_1$ may be obtained in the foregoing manner in operation 201 to operation 203. $T_{I_{102}}$ represents a pose conversion relationship of $I_0$ and $I_2$ relative to $I_1$. $T_{I_{102}}$ may be calculated through SLAM. Poses of $I_0$ and $I_2$ in the aerial model are calculated based on $T_{I_{102}}$, skyline rendering is separately performed based on a pose of $I_0$ and a pose of $I_2$ to obtain a skyline of $I_0$ obtained through rendering and a skyline of $I_2$ obtained through rendering, a matching degree between the skyline of $I_0$ obtained through rendering and a skyline of $I_0$ is calculated, a matching degree between the skyline of $I_2$ obtained through rendering and a skyline of $I_2$ is calculated, then matching degrees of skylines of $I_0$ and $I_2$ in the pose are calculated, and finally a sum of matching values of the skylines of $I_0$, $I_1$, and $I_2$ is denoted as $M_{sum}^{I_1}$, to measure estimation accuracy of $Pinitial_{I_i}^n$ (n=0, ..., N-1). For example, when n=3, corresponding $M_{sum}^{I_1}$ is highest. In this case, a corresponding initial pose $Pinitial_{I_1}^3$ is superior to another initial pose.

N poses are selected from $Pinitial_{I_i}^n$ (i=0, 1, 2; n=0, ..., N-1) based on a value ranking result of $M_{sum}^{I_i}$ (i=0, 1, 2), and optimized $Poptini_{I_i}^n$ (i=0, 1, 2; n=0, ..., N-1) is obtained based on the coordinate system conversion relationship calculated through SLAM. Herein, Poptini represents an optimized initial pose.

Operation 205: Determine the first pose based on the semantic information of the building lines and surfaces, the N optimized initial poses, and the aerial model.

The N optimized initial poses obtained in the previous operation are traversed, semantic information of building lines and surfaces in the N initial poses is obtained through rendering based on the aerial model, semantic reprojection errors of the initial poses are calculated based on line-plane semantic information of the building obtained through rendering and the semantic information of the building lines and surfaces obtained in operation 202, and a pose with a smallest semantic reprojection error is selected, to obtain a 3-DoF pose of the first image $I_0$. Information about other three degrees of freedom of the first image is obtained based on a relationship between the camera coordinate system and the gravity direction calculated through SLAM, to obtain a 6-DoF pose (a 6-DoF pose relative to a world coordinate system) of the first image $I_0$, that is, the foregoing first pose.

Optionally, a more accurate pose may be calculated by using PnL (Perspective-n-Line). In other words, the 6-DoF pose of the first image $I_0$ is optimized by performing the following operations, and the optimized pose is used as the first pose.

For example, specific operations of optimizing the 6-DoF pose of the first image $I_0$ and determining the first pose may be as follows:

a: Extract 3D line segment information in a current viewing angle (for example, horizontal and vertical line segments of a building) from the aerial model based on a current pose (6-DoF pose of the first image $I_0$).

b: Input the 3D line segment information into the PnL algorithm, to output an optimized pose.

c: Obtain a semantic segmentation map through reprojection and rendering on a corresponding aerial model based on the optimized pose, and calculate a matching error between the first image and the semantic segmentation map corresponding to the image; and repeat operations b and c until the matching error is converged to obtain a finer 6-DoF pose.

d: Randomly sample some poses near the calculated pose, and repeat operations a to c, where if a calculated pose is better (which is measured based on a semantic reprojection matching error between an image in the aerial model and an image captured by a mobile phone), update with the pose is performed, to avoid as much as possible a locally optimal pose optimized in the foregoing operations.

Operation 206: Determine an optimized first pose based on a relative pose between the first pose, the first image, and the at least one second image.

For example, optimized PoseGraph is calculated based on a relative pose that is between the first image and the at least one second image (which is also referred to as inter-frame) and that is calculated through SLAM, to obtain optimal 6-DoF pose estimation of the first image $I_0$, that is, the optimized first pose.

In this embodiment, N initial poses are determined based on the skyline of the first image, and the first pose is obtained optimization based on the semantic information of the building lines and surfaces of the first image and the N initial poses. In this way, the skyline and the semantic information of the building lines and surfaces of the first image can be effectively combined to improve a success rate and accuracy of visual localization.

In a visual localization process, the pose may be further improved in combination of the skyline and semantic information of building lines and surfaces of the at least one second image, to improve localization accuracy.

Figure 8:
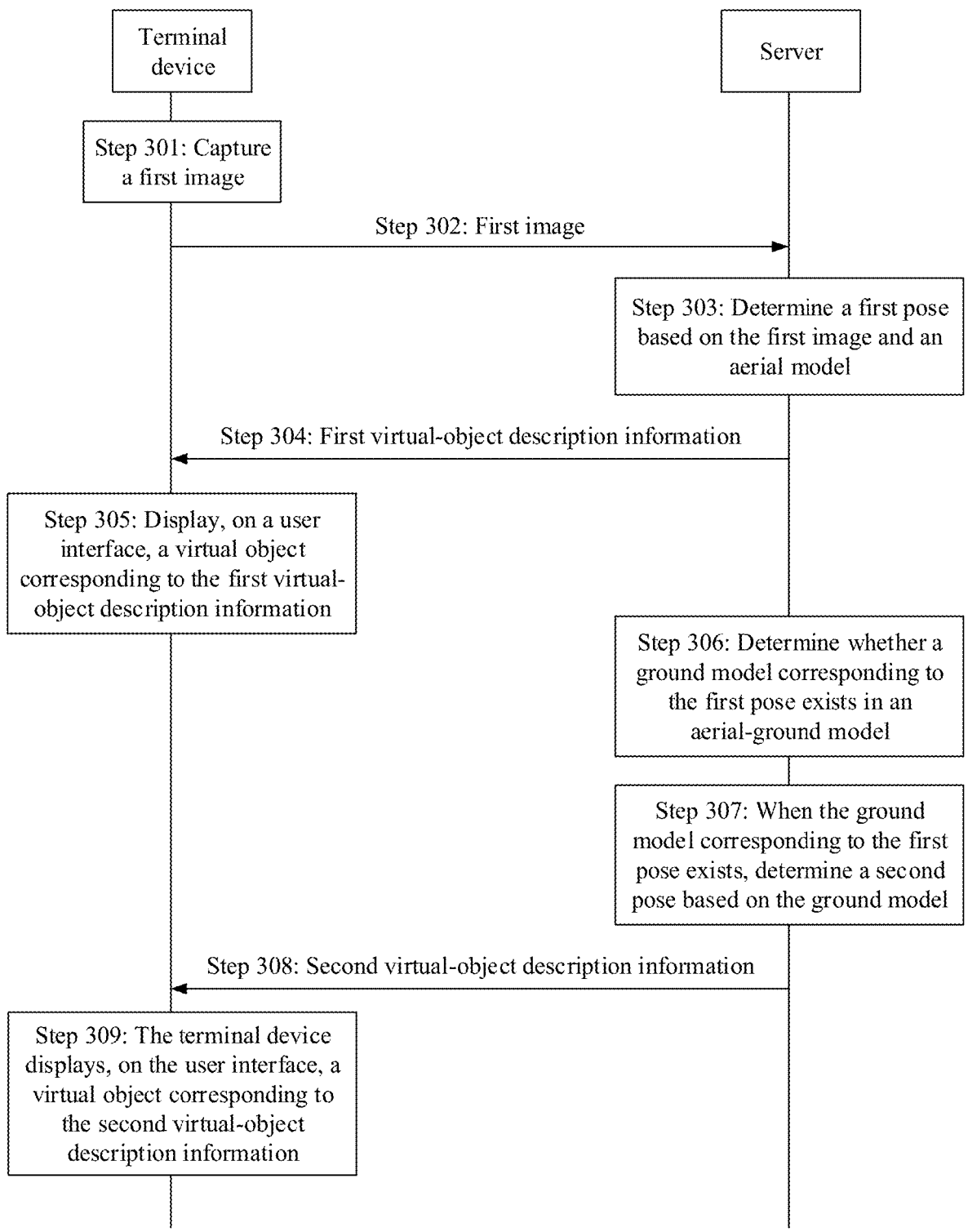
FIG. 8 is another flowchart of a visual localization method according to an embodiment of this application.

FIG. 8 is another flowchart of a visual localization method according to an embodiment of this application. A terminal device and a server are used in the method in this embodiment. Based on the embodiment shown in FIG. 5, in this embodiment, a first pose of a first image is further optimized with reference to an aerial-ground model, to implement more accurate visual localization. As shown in FIG. 8, the method in this embodiment may include the following operations.

Operation 301: The terminal device captures the first image.

Operation 302: The terminal device sends the first image to the server.

Operation 303: The server determines the first pose based on the first image and an aerial model.

Operation 304: The server determines first virtual-object description information based on the first pose, and sends the first virtual-object description information to the terminal device.

Operation 305: The terminal device displays, on a user interface, a virtual object corresponding to the first virtual-object description information.

For explanations and descriptions of operations 301 to 305, refer to operations 101 to 105 in the embodiment shown in FIG. 5. Details are not described herein again.

Operation 306: The server determines whether a ground model corresponding to the first pose exists in the aerial-ground model; and performs operation 307 when the ground model corresponding to the first pose exists.

The aerial-ground model includes the aerial model and the ground model mapped to the aerial model, and a coordinate system of the ground model in the aerial-ground model is the same as a coordinate system of the aerial model. For a specific manner of constructing the aerial-ground model, refer to specific explanations and descriptions of an embodiment shown in FIG. 10.

Operation 307: When the ground model corresponding to the first pose exists, determine a second pose based on the ground model.

Localization accuracy of the second pose is higher than the localization accuracy of the first pose.

Fine visual localization can be performed based on the ground model corresponding to the first pose, to determine the second pose. The fine visual localization may include processing procedures such as image retrieval, feature point extraction, and feature point matching.

Operation 308: The server determines second virtual-object description information based on the second pose, and sends the second virtual-object description information to the terminal device.

For example, the server may determine the second virtual-object description information based on the second pose. The second virtual-object description information is for displaying a corresponding virtual object on the terminal device, for example, a guide icon of a coffee shop shown in FIG. 4A. The guide icon is displayed in an actual scenario in the real world, that is, on a building shown in FIG. 4A.

Compared with the first virtual-object description information, the second virtual-object description information is determined based on a finer second pose, and the virtual object corresponding to the second virtual-object description information may be a more detailed virtual object. For example, the virtual object corresponding to the first virtual-object description information may be a road guide icon, and the virtual object corresponding to the second virtual-object description information may be a guide icon of a shop in a street.

Operation 309: The terminal device displays, on the user interface, the virtual object corresponding to the second virtual-object description information.

The terminal device displays, on the user interface, the virtual object corresponding to the first virtual-object description information and the virtual object corresponding to the second virtual-object description information. The actual scenario in the real world is displayed on the user interface, and the virtual object may be displayed on the user interface through augmented reality.

In this embodiment, the server determines whether the ground model corresponding to the first pose exists in the aerial-ground model; and when the ground model corresponding to the first pose exists, determines the second pose based on the ground model. The server determines the second virtual-object description information based on the second pose, and sends the second virtual-object description information to the terminal device. The terminal device displays, on the user interface, the virtual object corresponding to the second virtual-object description information. This can improve a success rate and accuracy of visual localization, and accuracy of pushing virtual-object description information to the terminal device by the server.

Figure 9:
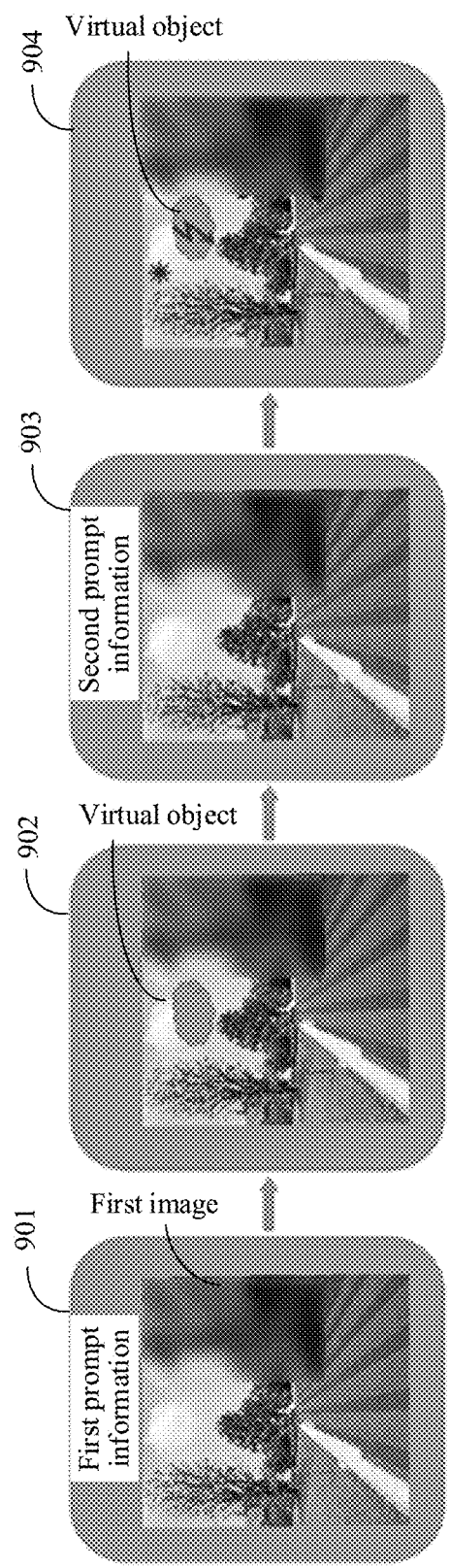
FIG. 9 is a schematic diagram of a user interface according to an embodiment of this application.

With reference to FIG. 9, the following describes the visual localization method in the embodiment shown in FIG. 8 by using a specific example.

FIG. 9 is a schematic diagram of a user interface according to an embodiment of this application. As shown in FIG. 9, a user interface 901 to a user interface 904 are included.

As shown in the user interface 901, the terminal device may capture a first image. The first image is displayed on the user interface 901.

Optionally, first prompt information may be further displayed on the user interface 901. The first prompt information is for prompting a user to photograph a skyline. For example, the first prompt information may be "Ensure that a skyline is photographed".

The first image on the user interface 901 includes a skyline, and therefore, a visual localization requirement can be met. The terminal device may send the first image to the server by performing operation 302. By performing the foregoing operations 303 and 304, the server may determine a first pose, and send, to the terminal device, first virtual-object description information corresponding to the first pose. The terminal device may display the user interface 902 based on the first virtual-object description information, and the user interface 902 presents a virtual object corresponding to the first virtual-object description information, for example, a cloud.

By performing operation 306, the server may further determine whether a ground model corresponding to the first pose exists in an aerial-ground model, and may send an indication message to the terminal device when the ground model corresponding to the first pose exists. The indication message indicates that the ground model corresponding to the first pose exists in the aerial-ground model. The terminal device may display second prompt information on the user interface based on the indication message. The second prompt information is for prompting an available operation mode to the user. For example, for details, refer to a user interface 903. The second prompt information is "Whether further localization is required" and operation icons are "Yes" and "No".

The user may tap the operation icon "Yes", and the terminal device sends a localization optimization request message to the server based on the operation of the user. The localization optimization request message is for requesting to calculate a second pose. By performing operations 307 and 308, the server determines the second pose, and sends second virtual-object description information to the terminal device. The terminal device presents, on the user interface, a virtual object corresponding to the second virtual-object description information, for example, a user interface 904. The user interface 904 presents the virtual object corresponding to the first virtual-object description information, for example, a cloud, and virtual bodies corresponding to the second virtual-object description information, for example, a sun and lightning.

The server in this embodiment of this application performs two operations: One is online calculation in visual localization, including calculation of the first pose and calculation of the second pose, as described in the foregoing embodiments. The other is construction of an offline aerial-ground map. For details, refer to FIG. 10. The offline aerial-ground map is constructed as follows: The server side obtains a plurality of images that are uploaded by the terminal device and that are for constructing the ground model, and determines first poses of the plurality of images in the aerial model according to the improved visual localization (e.g., geo-localization) algorithm in this embodiment of this application. In addition, the server side performs SFM operations on the plurality of images to construct the ground model, and obtains poses of the plurality of images in the ground model; and aligns the aerial model with the ground model based on the obtained first poses of the plurality of images in the aerial model and corresponding poses in the corresponding ground model by using a semantic reprojection error, to obtain the aerial-ground model.

Figure 10:
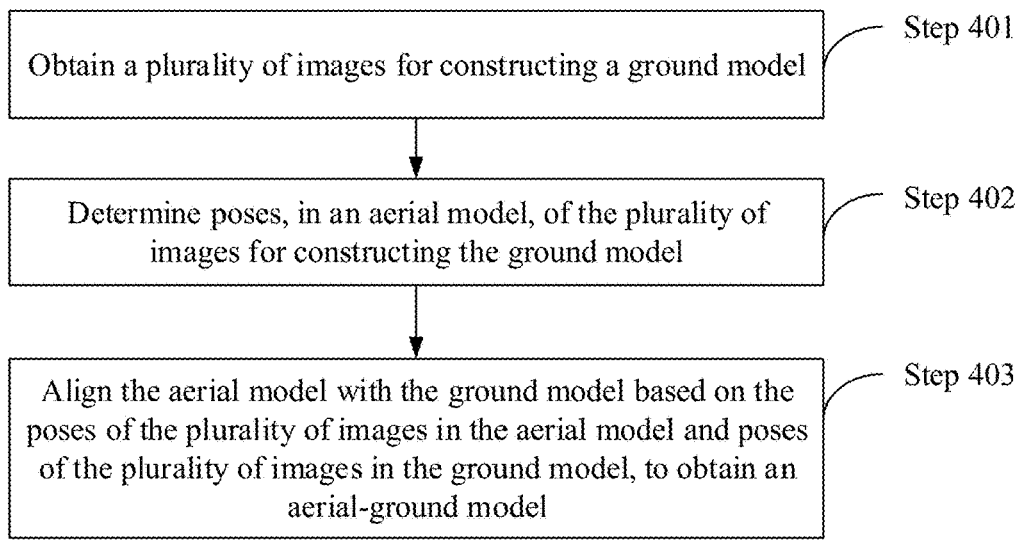
FIG. 10 is a flowchart of an aerial-ground model construction method according to an embodiment of this application.

FIG. 10 is a flowchart of an aerial-ground model construction method according to an embodiment of this application. As shown in FIG. 10, the method may include the following operations.

Operation 401: Obtain a plurality of images for constructing a ground model.

Figure 11:
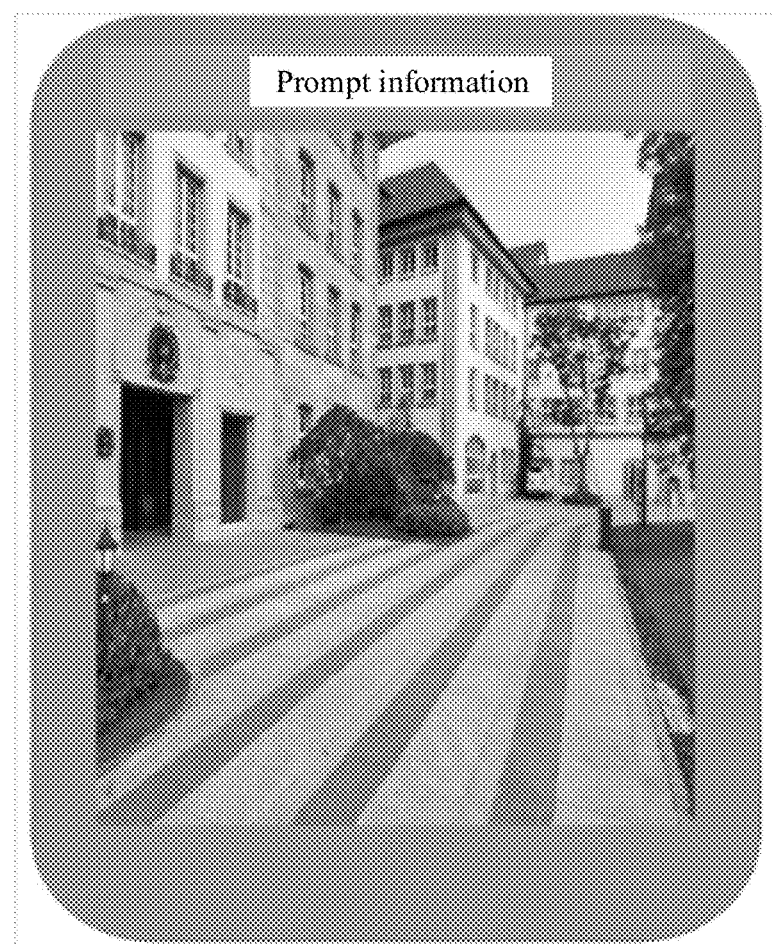
FIG. 11 is a schematic diagram of a user interface according to an embodiment of this application.

For example, in a local area, a user captures an image by using a terminal device and uploads the image to a server, and the server performs 3D modeling according to an SFM algorithm to obtain the ground model. That is, the image is for constructing the ground model. A skyline needs to be captured in the image. In a process in which the user captures the image, prompt information on a user interface shown in FIG. 11 may be used to prompt an image photographing requirement to the user.

Figure 12:
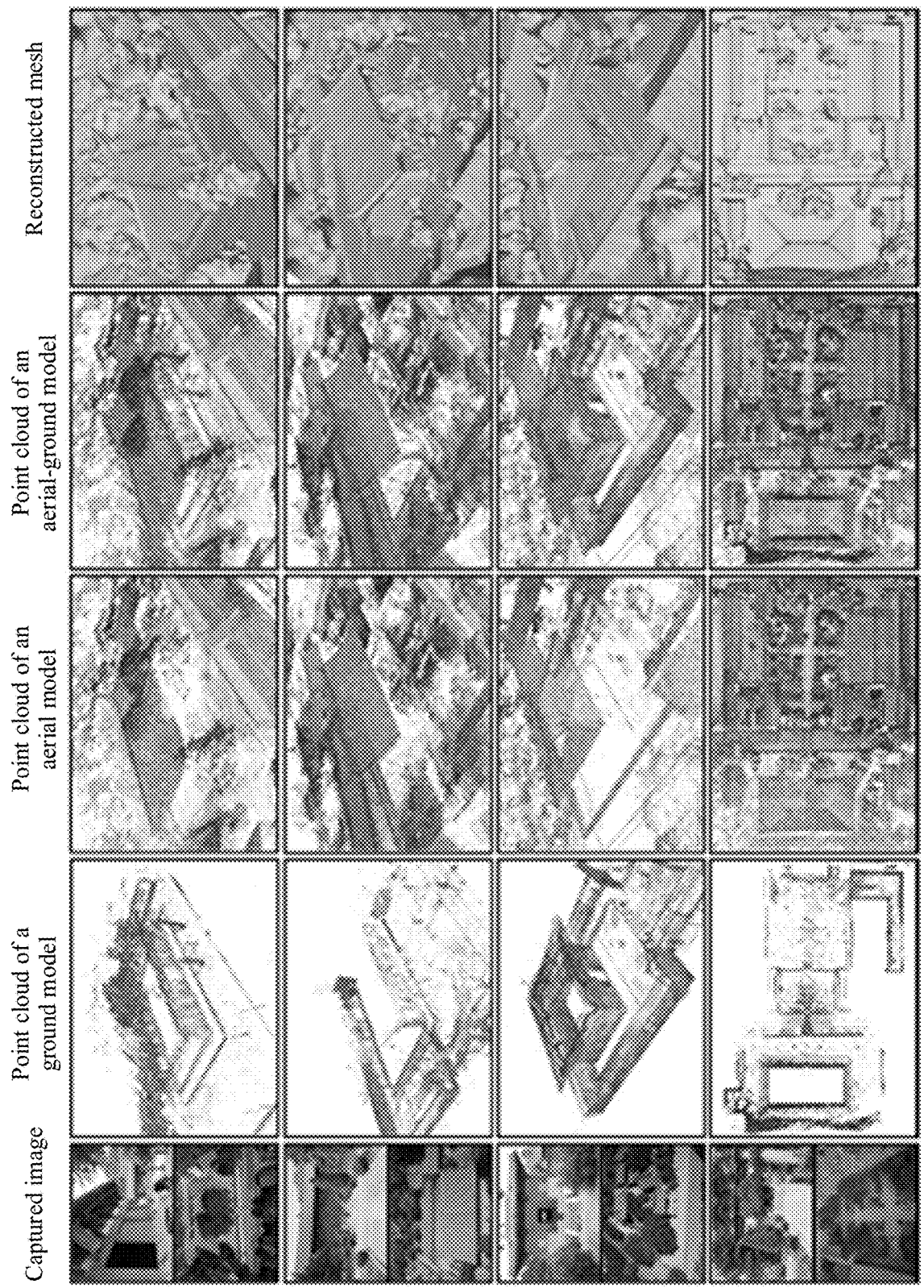
FIG. 12 is a schematic diagram of aerial-ground model construction according to an embodiment of this application.

For example, an image in the first column in each row shown in FIG. 12 is an image for constructing the ground model. A point cloud of the ground model constructed based on an image may be shown in the second column.

Operation 402: Determine poses, in an aerial model, of the plurality of images for constructing the ground model.

The aerial model may be an aerial model obtained by first performing image capture on an application scenario by using an unmanned aerial vehicle/a satellite, and then performing 2.5D model construction based on tilt photography. For example, an image in the first column in each row shown in FIG. 12 is an image captured by the unmanned aerial vehicle/satellite, and is for constructing the aerial model. A point cloud of the constructed aerial model may be shown in the third column.

In this embodiment, a pose of an image in the aerial model may be determined by using the aerial model-based improved visual localization (e.g., geo-localization) method shown in FIG. 6. In embodiments, the first image in the method shown in FIG. 6 is replaced by each image in operation 401 in this embodiment, to determine a pose of each image in the aerial model.

Operation 403: Align the aerial model with the ground model based on the poses of the plurality of images in the aerial model and poses of the plurality of images in the ground model, to obtain an aerial-ground model.

The aerial-ground model includes the aerial model and the ground model mapped to the aerial model, and a coordinate system of the ground model in the aerial-ground model is the same as a coordinate system of the aerial model.

For example, a point cloud of the constructed aerial-ground model may be shown as an image in the fourth column in each row shown in FIG. 12, that is, a point cloud of the ground model and a point cloud of the aerial model are merged. A reconstructed mesh shown in the fifth column in each row shown in FIG. 12 may be obtained based on the point cloud of the aerial-ground model.

In an embodiment, a plurality of coordinate conversion relationships are determined based on the poses of the plurality of images in the aerial model and the poses of the plurality of images in the ground model. Semantic reprojection errors of the plurality of images in the aerial model are determined based on the plurality of coordinate conversion relationships respectively, and an optimal coordinate conversion relationship is selected from the plurality of coordinate conversion relationships as a coordinate conversion relationship of the aerial-ground model. The coordinate conversion relationship of the aerial-ground model is for aligning the aerial model with the ground model. The ground model is mapped to the aerial model based on the coordinate conversion relationship of the aerial-ground model, to obtain the aerial-ground model. The optimal coordinate conversion relationship is a coordinate conversion relationship that minimizes a semantic reprojection error. That is, in the foregoing manner, the ground model is registered with the aerial model to obtain the aerial-ground model.

A specific embodiment of aligning the aerial model with the ground model may be as follows:

It is assumed that a set of images for which the ground model is constructed based on the SFM is $I_i^G$ (i=0, . . . , M−1), that is, a total of M images participate in reconstruction. A pose of each image in the ground model is denoted as $P_i^G$ (i=0, . . . , M−1).

Visual localization (geo-localization) localization is performed to obtain a pose $P_i^A$ (i=0, . . . , M−1) of $I_i^G$ (i 0, . . . , M−1) in the aerial model.

A coordinate system conversion relationship $T_i^{G2A}$ (i=0, . . . , M−1) between the ground model and the aerial model may be obtained for each image based on $P_i^G$ (i=0, . . . , M−1) and $P_i^A$ (i=0, . . . , M−1) through similar conversion.

$T_i^{G2A}$ (i=0, . . . , M−1) is traversed. For example, semantic reprojection errors of $I_i^G$ (i=0, . . . , M−1) in the aerial model are calculated based on $T_m^{G2A}$. The semantic reprojection errors herein are errors of horizontal and vertical lines and surfaces of the building. The semantic reprojection errors are accumulated to obtain $\text{ErrSeg}_{T_m} \cdot T_i^{G2A}$ (i=0, . . . , M−1) is traversed to obtain different semantic reprojection errors $\text{ErrSeg}_{T_i}$ (i=0, . . . , M−1).

Poses of $I_i^G$ (i=0, . . . , M−1) in the aerial model are obtained based on $T_m^{G2A}$, a semantic segmentation map is obtained through reprojection and rendering on a corresponding 2.5D aerial model based on a converted pose, and a projection error is determined based on the semantic segmentation map obtained through rendering and semantic information of images in $I_i^G$ (i=0, . . . , M−1).

$T_i^{G2A}$ corresponding to a smallest value in $\text{ErrSeg}_{T_i}$ (i=0, . . . , M−1) is selected as an optimal coordinate system conversion relationship of the aerial-ground model.

In this embodiment, the ground model is mapped to the aerial model to construct the aerial-ground model. The aerial-ground model is a hierarchical model into which large-scale scenario information of the aerial model and fine information of the ground model are merged. In this case, the visual localization method using the aerial-ground model can implement quick, efficient, and coarse localization applicable to a large-scale scenario, to meet county/city-level visual localization requirements. In addition, fine visual localization is performed based on a result of coarse localization, to implement hierarchical visual localization and improve accuracy of visual localization is improved.

Figure 13:
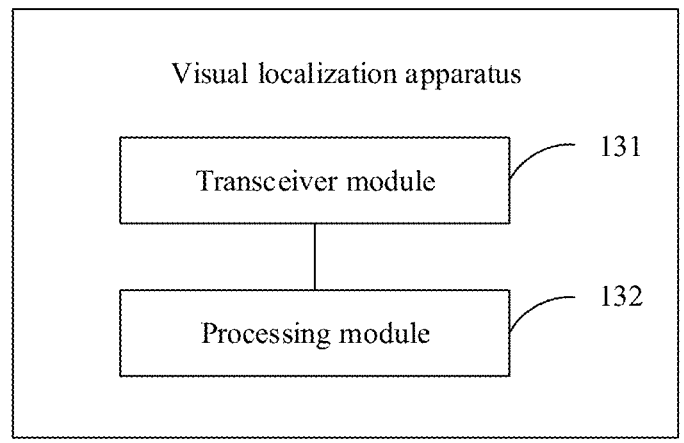
FIG. 13 is a schematic diagram of a structure of a visual localization apparatus according to an embodiment of this application.

An embodiment of this application further provides a visual localization apparatus, configured to perform the method operations performed by the server or the processor of the server in the foregoing method embodiments. As shown in FIG. 13, the visual localization apparatus may include a transceiver module 131 and a processing module 132.

The processing module 132 is configured to obtain, by using the transceiver module 131, a first image captured by a terminal device.

The processing module 132 is further configured to: determine a first pose based on the first image and an aerial model; determine whether a ground model corresponding to the first pose exists in an aerial-ground model; and when the ground model corresponding to the first pose exists, determine a second pose based on the ground model.

The aerial-ground model includes the aerial model and the ground model mapped to the aerial model, a coordinate system of the ground model in the aerial-ground model is the same as a coordinate system of the aerial model, and localization accuracy of the second pose is higher than localization accuracy of the first pose.

In some embodiments, the processing module 132 is configured to: determine an initial pose set based on location information and magnetometer angle deflection information of the terminal device corresponding to the first image; obtain a skyline and semantic information of building lines and surfaces of the first image based on the first image; determine N initial poses from the initial pose set based on the skyline of the first image and the aerial model; and determine the first pose based on the semantic information of the building lines and surfaces, the N initial poses, and the aerial model, where N is an integer greater than 1.

In some embodiments, the processing module 132 is further configured to obtain, by using the transceiver module 131, at least one second image captured by a terminal device, where there is an intersection between a photographing field of view of the first image and a photographing field of view of the at least one second image. The processing module 132 is further configured to: determine N optimized initial poses based on the N initial poses, the skyline of the first image, at least one skyline of the at least one second image, and a relative pose between the first image and the at least one second image; and determine the first pose based on the semantic information of the building lines and surfaces, the N optimized initial poses, and the aerial model.

In some embodiments, the processing module 132 is further configured to determine the N optimized initial poses based on the N initial poses and the relative pose between the first image and the at least one second image.

In some embodiments, the initial pose set includes a plurality of groups of initial poses, each group of initial poses includes initial location information and initial magnetometer angle deflection information, the initial location information falls within a first threshold range, the first threshold range is determined based on the location information of the terminal device, the initial magnetometer angle deflection information falls within a second threshold range, and the second threshold range is determined based on the magnetometer angle deflection information of the terminal device.

In some embodiments, a center value of the first threshold range is the location information of the terminal device, and a center value of the second threshold range is the magnetometer angle deflection information of the terminal device.

In some embodiments, the processing module 132 is configured to: perform skyline rendering based on each group of initial poses and the aerial model, to obtain a skyline corresponding to each group of initial poses; calculate a matching degree between the skyline of the first image and the skyline corresponding to each group of initial poses, to determine matching degrees of each group of initial poses; and determine the N initial poses from the initial pose set based on the matching degrees of each group of initial poses. The N initial poses are first N initial poses sorted in descending order of the matching degrees in the initial pose set.

In some embodiments, the processing module 132 is further configured to construct the aerial-ground model based on the aerial model and a plurality of third images for constructing the ground model.

In some embodiments, the processing module 132 is configured to: determine poses of the plurality of third images in the aerial model based on the aerial model; and determine the aerial-ground model based on the poses of the plurality of third images in the aerial model and poses of the plurality of third images in the ground model.

In some embodiments, the processing module 132 is configured to: determine a plurality of coordinate conversion relationships based on the poses of the plurality of third images in the aerial model and the poses of the plurality of third images in the ground model; and determine semantic reprojection errors of the plurality of third images in the aerial model based on the plurality of coordinate conversion relationships respectively, and select an optimal coordinate conversion relationship from the plurality of coordinate conversion relationships as a coordinate conversion relationship of the aerial-ground model. The optimal coordinate conversion relationship is a coordinate conversion relationship that minimizes a semantic reprojection error.

In some embodiments, the processing module 132 is further configured to: determine first virtual-object description information based on the first pose; and send the first virtual-object description information to the terminal device by using the transceiver module 131, where the first virtual-object description information is for displaying a corresponding virtual object on the terminal device.

In some embodiments, the processing module 132 is further configured to: determine second virtual-object description information based on the second pose; and send the second virtual-object description information to the terminal device by using the transceiver module 131, where the second virtual-object description information is for displaying a corresponding virtual object on the terminal device.

The visual localization apparatus provided in this embodiment of this application may be configured to perform the foregoing visual localization method. For content and effects of the visual localization apparatus, refer to the method part. Details are not described again in this embodiment of this application.

Figure 14:
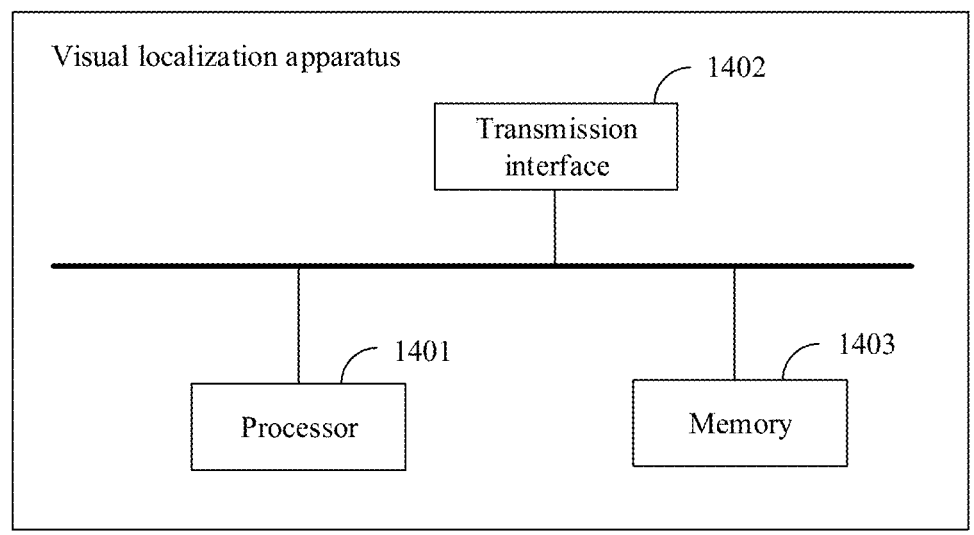
FIG. 14 is another schematic diagram of a structure of a visual localization apparatus according to an embodiment of this application.

An embodiment of this application further provides a visual localization apparatus. As shown in FIG. 14, the visual localization apparatus includes a processor 1401 and a transmission interface 1402. The transmission interface 1402 is configured to obtain a captured first image.

The transmission interface 1402 may include a transmit interface and a receive interface. For example, the transmission interface 1402 may be any type of interface according to any proprietary or standardized interface protocol, for example, a high-definition multimedia interface (HDMI), a mobile industry processor interface (MIPI), an MIPI-standardized display serial interface (DSI), a video electronics standards association (VESA)-standardized embedded display port (eDP), a display port (DP), or a V-By-One interface. The V-By-One interface is a digital interface standard developed for image transmission. The transmission interface 1402 may also include any wired or wireless interface, an optical interface, or the like.

The processor 1401 is configured to invoke a program instruction stored in a memory, to perform the visual localization method in the foregoing method embodiment. For content and effects of the visual localization method, refer to the method part. Details are not described again in this embodiment of this application. Optionally, the apparatus further includes a memory 1403. The processor 1401 may be a single-core processor or a multi-core processor group. The transmission interface 1402 is an interface for receiving or sending data. Data processed by the visual localization apparatus may include audio data, video data, or image data. For example, the visual localization apparatus may be a processor chip.

Some other embodiments of this application further provide a computer storage medium. The computer storage medium may include computer instructions. When the computer instructions are run on an electronic device, the electronic device is enabled to perform the operations performed by the server in the foregoing method embodiments.

Some other embodiments of this application further provide a computer program product. When the computer program product runs on a computer, the computer is enabled to perform the operations performed by the server in the foregoing method embodiments.

Some other embodiments of this application further provide an apparatus. The apparatus has a function of implementing behaviors of the server in the foregoing method embodiments. The function may be implemented by hardware, or may be implemented by hardware executing corresponding software. The hardware or the software includes one or more modules corresponding to the foregoing functions, for example, an obtaining unit or module and a determining unit or module.

Figure 15:
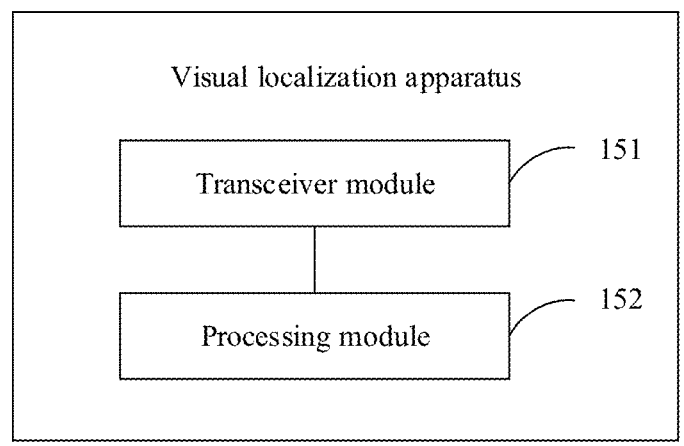
FIG. 15 is another schematic diagram of a structure of a visual localization apparatus according to an embodiment of this application.

An embodiment of this application further provides a visual localization apparatus, configured to perform the method operations performed by the terminal device or the processor of the terminal device in the foregoing method embodiments. As shown in FIG. 15, the visual localization apparatus may include a processing module 151 and a transceiver module 152.

The processing module 151 is configured to: capture a first image, and display the first image on a user interface. The first image includes a photographed skyline.

The processing module 151 is further configured to send the first image to a server by using the transceiver module 152.

The transceiver module 152 is configured to receive first virtual-object description information sent by the server. The first virtual-object description information is determined based on a first pose, the first pose is determined based on an aerial model, and a skyline and semantic information of building lines and surfaces of the first image.

The processing module 151 is further configured to superimpose and display, on the user interface, a virtual object corresponding to the first virtual-object description information.

In some embodiments, the processing module 151 is further configured to: before capturing the first image, display first prompt information on the user interface. The first prompt information is for prompting a user to photograph the skyline.

In some embodiments, the transceiver module 152 is further configured to receive an indication message sent by the server. The indication message indicates that a ground model corresponding to the first pose exists in an aerial-ground model, the ground model is for determining a second pose, the aerial-ground model includes the aerial model and the ground model mapped to the aerial model, and a coordinate system of the ground model is the same as a coordinate system of the aerial model. The processing module 151 is further configured to display second prompt information on the user interface based on the indication message. The second prompt information is for prompting an available operation mode to the user.

In some embodiments, the processing module 151 is further configured to: receive a re-localization instruction input by the user on the user interface or by using a hardware button, and send a localization optimization request message to the server in response to the re-localization instruction by using the transceiver module 152. The localization optimization request message is for requesting to calculate the second pose. The transceiver module 152 is further configured to receive second virtual-object description information sent by the server. The second virtual-object description information is determined based on the second pose, the second pose is determined based on the ground model corresponding to the first pose, and localization accuracy of the second pose is higher than localization accuracy of the first pose.

The visual localization apparatus provided in this embodiment of this application may be configured to perform the foregoing visual localization method. For content and effects of the visual localization apparatus, refer to the method part. Details are not described again in this embodiment of this application.

Figure 16:
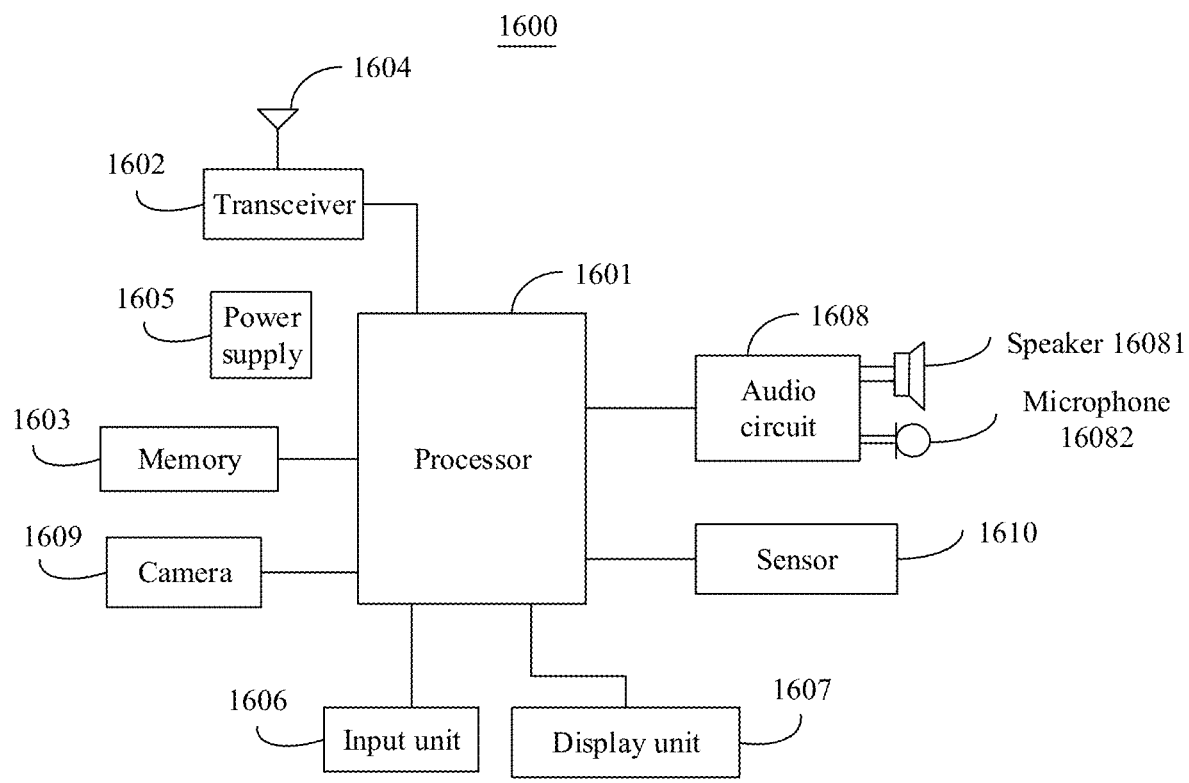
FIG. 16 is another schematic diagram of a structure of a visual localization apparatus according to an embodiment of this application.

FIG. 16 is a schematic diagram of a structure of a visual processing apparatus according to an embodiment of this application. As shown in FIG. 16, the visual processing apparatus 1600 may be the terminal device in the foregoing embodiments. The visual processing apparatus 1600 includes a processor 1601 and a transceiver 1602.

Optionally, the visual processing apparatus 1600 further includes a memory 1603. The processor 1601, the transceiver 1602, and the memory 1603 may communicate with each other through an internal connection path, to transfer a control signal and/or a data signal.

The memory 1603 is configured to store a computer program. The processor 1601 is configured to execute the computer program stored in the memory 1603, to implement the functions in the foregoing apparatus embodiments.

Optionally, the memory 1603 may be integrated into the processor 1601, or may be independent of the processor 1601.

Optionally, the visual processing apparatus 1600 may further include an antenna 1604, configured to transmit a signal output by the transceiver 1602. Alternatively, the transceiver 1602 receives a signal through the antenna.

Optionally, the visual processing apparatus 1600 may further include a power supply 1605, configured to supply power to various components or circuits in the terminal device.

In addition, to improve functions of the terminal device, the visual processing apparatus 1600 may further include one or more of an input unit 1606, a display unit 1607 (which may also be considered as an output unit), an audio circuit 1608, a camera 1609, a sensor 1610, and the like. The audio circuit may further include a speaker 16081, a microphone 16082, and the like. Details are not described again.

Some other embodiments of this application further provide a computer storage medium. The computer storage medium may include computer instructions. When the computer instructions are run on an electronic device, the electronic device is enabled to perform the operations performed by the terminal device in the foregoing method embodiments.

Some other embodiments of this application further provide a computer program product. When the computer program product runs on a computer, the computer is enabled to perform the operations performed by the terminal device in the foregoing method embodiments.

Some other embodiments of this application further provide an apparatus. The apparatus has a function of implementing behaviors of the terminal device in the foregoing method embodiments. The function may be implemented by hardware, or may be implemented by hardware executing corresponding software. The hardware or the software includes one or more modules corresponding to the foregoing functions, for example, a capture unit or module, a sending unit or module, and a display unit or module.

An embodiment of this application further provides an aerial-ground model construction apparatus, configured to perform the method operations in the foregoing embodiment shown in FIG. 10. The aerial-ground model construction apparatus may include an obtaining module and a processing module.

The obtaining module is configured to obtain a plurality of images for constructing a ground model.

The processing module is configured to determine poses, in an aerial model, of the plurality of images for constructing the ground model.

The processing module is further configured to align the aerial model with the ground model based on the poses of the plurality of images in the aerial model and poses of the plurality of images in the ground model, to obtain an aerial-ground model.

The aerial-ground model includes the aerial model and the ground model mapped to the aerial model, and a coordinate system of the ground model in the aerial-ground model is the same as a coordinate system of the aerial model.

In some embodiments, the processing module is configured to: determine a plurality of coordinate conversion relationships based on the poses of the plurality of images in the aerial model and the poses of the plurality of images in the ground model; determine semantic reprojection errors of the plurality of images in the aerial model based on the plurality of coordinate conversion relationships respectively, and select an optimal coordinate conversion relationship from the plurality of coordinate conversion relationships as a coordinate conversion relationship of the aerial-ground model, where the coordinate conversion relationship of the aerial-ground model is for aligning the aerial model with the ground model; and map the ground model to the aerial model based on the coordinate conversion relationship of the aerial-ground model, to obtain the aerial-ground model. The optimal coordinate conversion relationship is a coordinate conversion relationship that minimizes a semantic reprojection error.

The aerial-ground model construction apparatus provided in this embodiment of this application may be configured to perform the foregoing method operations in FIG. 10. For content and effects of the aerial-ground model construction apparatus, refer to the method part. Details are not described again in this embodiment of this application.

After obtaining the aerial-ground model, the aerial-ground model construction apparatus may configure the aerial-ground model in a corresponding server. The server provides a visual localization function service for the terminal device.

The processor mentioned in the foregoing embodiments may be an integrated circuit chip, and has a signal processing capability. In an embodiments of an implementation process, the operations in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, any conventional processor, or the like. The operations of the methods disclosed in embodiments of this application may be directly executed and completed by using a hardware encoding processor, or may be executed and completed by using a combination of hardware and software modules in the encoding processor. A software module may be located in a storage medium mature in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor.

The memory in the foregoing embodiments may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that, the memory in the system and method described in this specification includes but is not limited to these memories and any memory of another proper type.

A person of ordinary skill in the art may be aware that, in combination with units and algorithm operations in the examples described in embodiments disclosed in this specification, embodiments may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In embodiments provided in this application, it should be understood that, the disclosed system, apparatus, and method may be implemented in other manners. For example, the described apparatus embodiments are merely examples. For example, division into the units is merely logical function division, or may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in embodiments.

In addition, the functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or a compact disc.

What is claimed is:

1. A visual localization method, comprising:
   obtaining a captured first image;
   determining a first pose of a device that captured the first image based on the first image and an aerial model, the aerial model comprising a first map generated by an aerial vehicle or satellite;
   determining whether a ground model corresponding to the first pose exists in an aerial-ground model, the ground model comprising a second map generated by a terminal device; and
   in response to a determination that the ground model corresponding to the first pose exists in the aerial-ground model, determining a second pose of the device that captured the first image based on the ground model, wherein
   the aerial-ground model comprises the aerial model and the ground model mapped to the aerial model, a coordinate system of the ground model is the same as a coordinate system of the aerial model, and a visual localization accuracy of locating the second pose is higher than a visual localization accuracy of locating the first pose.

2. The method according to claim 1, wherein the determining the first pose based on the first image and the aerial model comprises:
   determining an initial pose set based on location information and magnetometer angle deflection information of a terminal device corresponding to the first image;
   obtaining a skyline and semantic information of building lines and surfaces of the first image based on the first image;
   determining N initial poses from the initial pose set based on the skyline of the first image and the aerial model; and
   determining the first pose based on the semantic information of the building lines and surfaces, the N initial poses, and the aerial model, wherein
   N is an integer greater than 1.

3. The method according to claim 2, wherein the method further comprises:
   obtaining at least one captured second image, wherein a viewing angle of the first image is different from viewing angels corresponding to the at least one second image; and
   determining N optimized initial poses based on the N initial poses, the skyline of the first image, at least one skyline of the at least one second image, and a relative pose between the first image and the at least one second image; and
   the determining the first pose based on the semantic information of the building lines and surfaces, the N initial poses, and the aerial model comprises:
   determining the first pose based on the semantic information of the building lines and surfaces, the N optimized initial poses, and the aerial model.

4. The method according to claim 3, wherein the method further comprises:
   determining the N optimized initial poses based on the N initial poses and the relative pose between the first image and the at least one second image.

5. The method according to claim 2, wherein the initial pose set comprises a plurality of groups of initial poses, each group of initial poses comprises initial location information and initial magnetometer angle deflection information, the initial location information falls within a first threshold range that is determined based on the location information of the terminal device, and the initial magnetometer angle deflection information falls within a second threshold range that is determined based on the magnetometer angle deflection information of the terminal device.

6. The method according to claim 5, wherein a center value of the first threshold range is the location information of the terminal device, and a center value of the second threshold range is the magnetometer angle deflection information of the terminal device.

7. The method according to claim 5, wherein the determining N initial poses from the initial pose set based on the skyline of the first image and the aerial model comprises:
   performing skyline rendering based on each group of initial poses and the aerial model, to obtain a skyline corresponding to each group of initial poses;
   calculating a matching degree between the skyline of the first image and the skyline corresponding to each group of initial poses, to determine matching degrees of each group of initial poses; and determining the N initial poses from the initial pose set based on the matching degrees of each group of initial poses, wherein the N initial poses are first N initial poses sorted in descending order of the matching degrees in the initial pose set.

8. The method according to claim 1, wherein the method further comprises:
determining virtual-object description information based on the first pose or the second pose; and
sending the virtual-object description information to the terminal device, wherein the virtual-object description information is for displaying a corresponding virtual object on the terminal device.

9. A visual localization method, comprising:
capturing a first image, and displaying the first image on a user interface, wherein the first image comprises a photographed skyline;
sending the first image to a server;
receiving first virtual-object description information for displaying a corresponding virtual object sent by the server, wherein the first virtual-object description information is determined based on a first pose of a device that captured the first image, the first pose is determined based on: an aerial model comprising a first map generated by an aerial vehicle or satellite, and the photographed skyline and semantic information of building lines and surfaces of the first image; and
superimposing and displaying, on the user interface, the virtual object corresponding to the first virtual-object description information.

10. The method according to claim 9, wherein before the capturing a first image, the method further comprises:
displaying first prompt information on the user interface, wherein the first prompt information prompts a user to capture an image of the photographed skyline.

11. A visual localization apparatus, comprising:
at least one processor; and
one or more memories coupled to the at least one processor and storing programming instructions, which when executed by the at least one processor, causes the apparatus to:
obtain a captured first image;
determine a first pose of a device that captured the first image based on the first image and an aerial model, the aerial model comprising a first map generated by an aerial vehicle or satellite;
determine whether a ground model corresponding to the first pose exists in an aerial-ground model, the ground model comprising a second map generated by a terminal device; and
in response to a determination that the ground model corresponding to the first pose exists in the aerial-ground model, determining a second pose of the device that captured the first image based on the ground model, wherein
the aerial-ground model comprises the aerial model and the ground model mapped to the aerial model, a coordinate system of the ground model is the same as a coordinate system of the aerial model, and a visual localization accuracy of locating the second pose is higher than a visual localization accuracy of locating the first pose.

12. The apparatus according to claim 11, wherein the programming instructions, when executed by the at least one processor, further causes the apparatus:

determine an initial pose set based on location information and magnetometer angle deflection information of a terminal device corresponding to the first image;
obtain a skyline and semantic information of building lines and surfaces of the first image based on the first image;
determine N initial poses from the initial pose set based on the skyline of the first image and the aerial model; and
determine the first pose based on the semantic information of the building lines and surfaces, the N initial poses, and the aerial model, wherein
N is an integer greater than 1.

13. The apparatus according to claim 12, wherein programming instructions, when executed by the at least one processor, further causes the apparatus to:
obtain at least one captured second image, wherein a viewing angle of the first image is different from viewing angels corresponding to the at least one second image; and
determine N optimized initial poses based on the N initial poses, the skyline of the first image, at least one skyline of the at least one second image, and a relative pose between the first image and the at least one second image; and
the apparatus to determine the first pose based on the semantic information of the building lines and surfaces, the N initial poses, and the aerial model further comprises the apparatus to:
determine the first pose based on the semantic information of the building lines and surfaces, the N optimized initial poses, and the aerial model.

14. The apparatus according to claim 13, wherein the programming instructions, when executed by the at least one processor, further causes the apparatus to:
determine the N optimized initial poses based on the N initial poses and the relative pose between the first image and the at least one second image.

15. The apparatus according to claim 12, wherein the initial pose set comprises a plurality of groups of initial poses, each group of initial poses comprises initial location information and initial magnetometer angle deflection information, the initial location information falls within a first threshold range that is determined based on the location information of the terminal device, and the initial magnetometer angle deflection information falls within a second threshold range that is determined based on the magnetometer angle deflection information of the terminal device.

16. The apparatus according to claim 15, wherein a center value of the first threshold range is the location information of the terminal device, and a center value of the second threshold range is the magnetometer angle deflection information of the terminal device.

17. The apparatus according to claim 15, wherein the programming instructions, when executed by the at least one processor, further causes the apparatus to:
perform skyline rendering based on each group of initial poses and the aerial model, to obtain a skyline corresponding to each group of initial poses;
calculate a matching degree between the skyline of the first image and the skyline corresponding to each group of initial poses, to determine matching degrees of each group of initial poses; and
determine the N initial poses from the initial pose set based on the matching degrees of each group of initial poses, wherein the N initial poses are first N initial poses sorted in descending order of the matching degrees in the initial pose set.

18. The apparatus according to claim 11, wherein the programming instructions, when executed by the at least one processor, further causes the apparatus to:
- determine virtual-object description information based on the first pose or the second pose; and
- send the virtual-object description information to the terminal device, wherein the virtual-object description information is for displaying a corresponding virtual object on the terminal device.

19. A visual localization apparatus, comprising:
- at least one processor; and
- one or more memories coupled to the at least one processor and storing programming instructions, which when executed by the at least one processor, causes the apparatus to:
  - capture a first image, and displaying the first image on a user interface, wherein the first image comprises a photographed skyline;
  - send the first image to a server;
  - receive first virtual-object description information for displaying a corresponding virtual object sent by the server, wherein the first virtual-object description information is determined based on a first pose of a device that captured the first image, the first pose is determined based on: an aerial model comprising a first map generated by an aerial vehicle or satellite, and the photographed skyline and semantic information of building lines and surfaces of the first image; and
  - superimpose and display, on the user interface, the virtual object corresponding to the first virtual-object description information.

20. The apparatus according to claim 19, wherein the programming instructions, which when executed by the at least one processor, further causes the apparatus to:
- before capturing the first image, display first prompt information on the user interface, wherein the first prompt information prompts a user to capture an image of the photographed skyline.

* * * * *